United States Patent
Bayon et al.

(10) Patent No.: US 12,483,409 B2
(45) Date of Patent: *Nov. 25, 2025

(54) DISTRIBUTED TOKENIZATION AUTHENTICATION

(71) Applicant: Amadeus S.A.S., Biot (FR)

(72) Inventors: Roman Bayon, Antibes (FR); Richard Beuvot, Mougins (FR)

(73) Assignee: Amadeus S.A.S., Biot (FR)

( * ) Notice: Subject to any disclaimer, the term of this patent is extended or adjusted under 35 U.S.C. 154(b) by 125 days.

This patent is subject to a terminal disclaimer.

(21) Appl. No.: 18/437,772

(22) Filed: Feb. 9, 2024

(65) Prior Publication Data
US 2024/0179003 A1    May 30, 2024

Related U.S. Application Data

(63) Continuation-in-part of application No. 17/098,846, filed on Nov. 16, 2020, now Pat. No. 11,921,877.

(30) Foreign Application Priority Data
Feb. 14, 2020 (FR) ........................................ 2001463

(51) Int. Cl.
*G06F 21/60* (2013.01)
*H04L 9/06* (2006.01)
(Continued)

(52) U.S. Cl.
CPC .......... *H04L 9/3213* (2013.01); *H04L 9/0656* (2013.01); *H04L 9/0869* (2013.01)

(58) Field of Classification Search
CPC .. G06F 21/6227; G06F 21/335; G06F 21/602; G06F 21/6254; G06F 21/6245; H04W 12/02; H04L 63/0435; H04L 9/14
See application file for complete search history.

(56) References Cited

U.S. PATENT DOCUMENTS

2005/0226420 A1   10/2005  Makela et al.
2012/0278504 A1*  11/2012  Ang ..................... H04L 61/301
                                                                     709/246
(Continued)

OTHER PUBLICATIONS

National Institute of Industrial Property, Preliminary Search Report issued in French Patent Application No. 2001463 dated Oct. 22, 2020; 9 pages.

(Continued)

*Primary Examiner* — Izunna Okeke
(74) *Attorney, Agent, or Firm* — Thompson Hine LLP

(57) ABSTRACT

Systems and methods for providing a tokenization authentication process. A node receives an encrypted token comprising a first set of sensitive data. The encrypted token was generated by a randomization service based on a mapping structure. A second set of sensitive data is determined using a detokenization process based on the encrypted token. A rebuilt token is generated using a retokenization process based on the second set of sensitive data. In response to determining that the encrypted token is validated, the first set of sensitive data is provided to an application interface of a first process executing using a first set of computing resources that are isolated from a second set of computing resources that the node allocates to the randomization service.

20 Claims, 12 Drawing Sheets

(51) Int. Cl.
H04L 9/08 (2006.01)
H04L 9/32 (2006.01)

(56) References Cited

U.S. PATENT DOCUMENTS

2019/0068558 A1    2/2019  Jindal
2019/0342088 A1*  11/2019  Eidson .................... H04L 9/14

OTHER PUBLICATIONS

A. Ukil, "Privacy Preserving Data Aggregation in Wireless Sensor Networks," 2010 6th International Conference on Wireless and Mobile Communications, Valencia, 2010, pp. 435-440.
European Patent Office; Extended European Search Report and Written Opinion issued in European Patent Application No. 20208945.4 on Jan. 18, 2021; 6 pages.

* cited by examiner

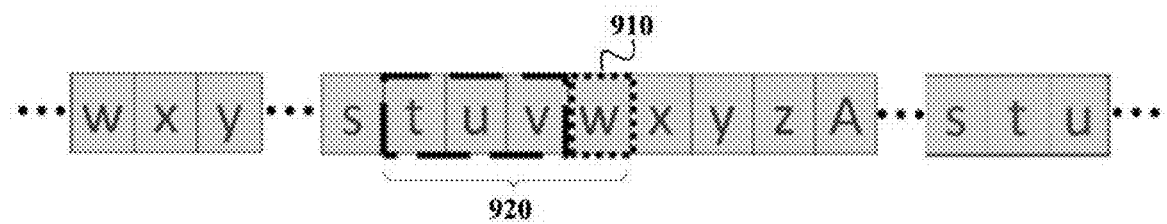
FIG. 9
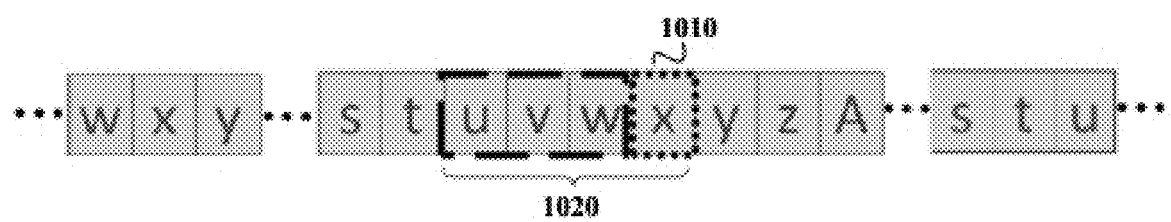
FIG. 10
$$1100 \quad SD = \underbrace{444433}_{1102} - \underbrace{332222}_{1104} - \underbrace{1111}_{1106}$$
$$1150 \quad TK = \underbrace{444433}_{1102} - \underbrace{a4Z5be}_{1154} - \underbrace{1111}_{1106}$$
FIG. 11

DISTRIBUTED TOKENIZATION AUTHENTICATION

CROSS-REFERENCE TO RELATED APPLICATIONS

This Application is a continuation-in-part of U.S. patent application Ser. No. 17/098,846, filed Nov. 16, 2020, which is incorporated by reference herein in its entirety.

TECHNICAL FIELD

The present invention relates generally to tokenization processes, although not limited thereto. More specifically, the present invention relates to techniques for providing decentralized tokenization with mapping data devoid of sensitive data.

BACKGROUND

Some electronic data stored on computing devices or exchanged between computing devices over communication channels coupling such devices includes sensitive data. Examples of such sensitive data includes: credential information (e.g., password, user name, etc.), electronic Personal Health Information, Primary Account Numbers, social security numbers, credit card numbers, and the like. In some instances, an unauthorized person may obtain such sensitive data for nefarious purposes. Consequently, various techniques are used to mitigate exposure of such sensitive data to unauthorized persons.

One such technique used to mitigate exposure of sensitive data to unauthorized persons is known as data tokenization. Data tokenization or tokenization generally refers to a process of replacing sensitive data with non-sensitive data. As explained by the Payment Card Industry ("PCI") Security Standards Council "[t]he security objective of a tokenization process is to ensure the resulting token has no value to an attacker." To that end, a tokenization process is configured to generate "tokens" (e.g., tokenized versions of sensitive data) that lack any extrinsic meaning or value. Since tokens lack any extrinsic meaning or value, mapping data is generally retained that associates each token with a particular instance of sensitive data it replaces. Such mapping data may facilitate deriving replaced sensitive data from a corresponding token.

However, some of the prior techniques that provided distributed random tokens and authentication processes were not deterministic, provided only short-term solutions, and were difficult, if not impossible, to detect whether the token expired. Thus, improved techniques of tokenizing sensitive data, enhancing security of mapping data, and authentication systems are needed to meet the security objective of a tokenization process.

SUMMARY

Embodiments of the present invention provide systems, methods, and computer-readable storage media for implementing a tokenization authentication system. The method, at an electronic including one or more processors, includes receiving, by a node, an encrypted token comprising a first set of sensitive data, where the encrypted token was generated by a randomization service based on a mapping structure. The method further includes determining, based on the encrypted token, a second set of sensitive data using a detokenization process. The method further includes generating, based on the second set of sensitive data, a rebuilt token using a retokenization process. The method further includes determining whether the encrypted token is validated by comparing the encrypted token and the rebuilt token. The method further includes, in response to determining that the encrypted token is validated, providing the first set of sensitive data to an application interface of a first process executing using a first set of computing resources that are isolated from a second set of computing resources that the node allocates to the randomization service.

In some embodiments of the invention, the mapping structure includes a plurality of index values, and wherein generating the token by the randomization service comprises selecting an index value from among the plurality of index values from a random value database. In some embodiments of the invention, the index value is determined based on an index row selection of an index database. In some embodiments of the invention, the index value is selected based on utilization of a deterministic pseudo random generator. In some embodiments of the invention, the pseudo random generator selects the index value based on a seed, wherein the seed iteratively changes at a same frequency as the random value database.

In some embodiments of the invention, the detokenization process decodes the token based on the mapping structure and an index value extracted from the token. In some embodiments of the invention, the mapping structure is a first mapping structure of a plurality of mapping structures, and wherein the detokenization process detokenizes the encrypted token using the plurality of mapping structures.

In some embodiments of the invention, the comparison between the encrypted token and the rebuilt token is based on determining the encryption data associated with the encrypted token matches encryption data associated with the rebuilt token.

In some embodiments of the invention, the method further includes, in response to determining that the encrypted token is not validated, providing an error message to the application interface.

In some embodiments of the invention, the node is a first node at a first datacenter, and wherein the encrypted token is received from a second node at a second datacenter that is different than the first datacenter. In some embodiments of the invention, the node is a first node, and wherein the first set of computing resources are allocated to the process executing using the first set of computing resources by a second node that is different than the first node. In some embodiments of the invention, the first set of computing resources are allocated to the process by the node.

In some embodiments of the invention, the method further includes encrypting the first set of sensitive data prior to providing the first set of sensitive data to the application interface of the first process executing using the first set of computing resources.

In some embodiments of the invention, the encrypted token and the first set of sensitive data are each composed of an equivalent number of bytes, and wherein the encrypted token comprises a first number of bits and the first set of sensitive data comprises a second number of bits that is different from the first number of bits.

In some embodiments of the invention, a device including a non-transitory computer-readable storage medium, and one or more processors coupled to the non-transitory computer-readable storage medium, wherein the non-transitory computer-readable storage medium includes program instructions that, when executed by the one or more processors, cause the one or more processors to perform the method as described above.

In some embodiments of the invention, a computing apparatus including one or more processors, at least one memory device coupled with the one or more processors, and a data communications interface operably associated with the one or more processors, where the memory device contains a plurality of program instructions that, when executed by the one or more processors, cause the computing apparatus to perform the method as described above.

In some embodiments of the invention, a non-transitory computer storage medium encoded with a computer program is provided, where the computer program includes a plurality of program instructions that when executed by one or more processors cause the one or more processors to perform the method as described above.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The accompanying drawings, which are incorporated in and constitute a part of this specification, illustrate various embodiments of the present invention and, together with the general description of the invention given above, and the detailed description of the embodiments given below, serve to explain the embodiments of the invention. In the drawings, like reference numerals are used to indicate like parts in the various views.

FIG. 9 illustrates an example of mapping structure versioning at a first time.

FIG. 10 illustrates the example of mapping structure versioning at a second time that is subsequent to the first time illustrated in FIG. 9.

FIG. 11 illustrates an example of sensitive data and an associated token having an equivalent number of bytes while having a dissimilar number of bits.

DETAILED DESCRIPTION

Figure 1:
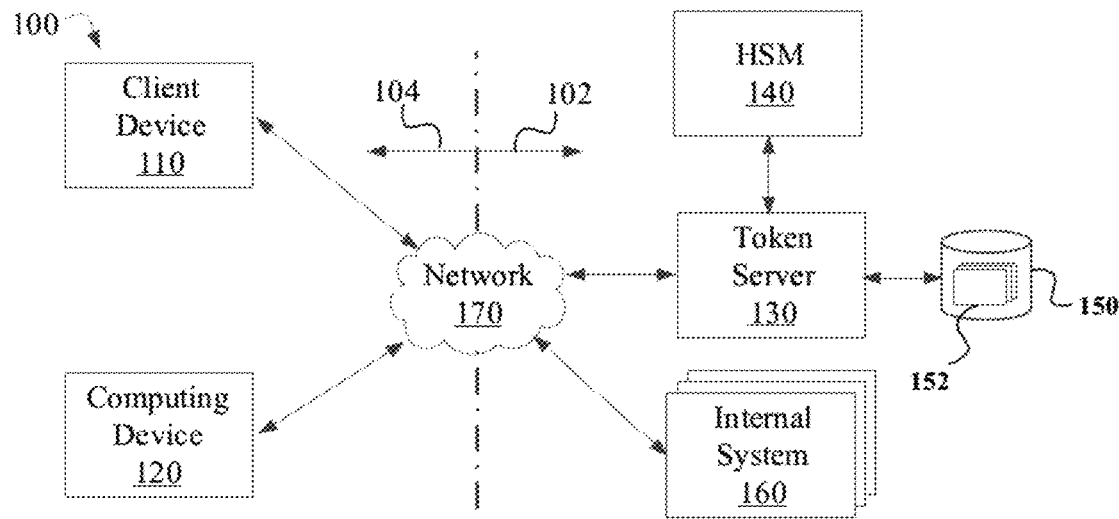
FIG. 1 is a block diagram of an example operating environment that is suitable for implementing aspects of the present invention.

Techniques described herein relate to tokenizing sensitive data and enhancing security of token mapping data and implementing a tokenization authentication system. Referring to FIG. 1, an example operating environment for implementing aspects of the present invention is illustrated and designated generally 100. Operating environment 100 includes client device 110, computing device 120, token server 130, hardware security module ("HSM") 140, database or token vault 150, and internal system 160. FIG. 1 depicts the various computing devices as communicating with each other via networks (e.g., network 170), which may include one or more public and/or private networks. Examples of networks that are suitable for implementing network 170 include: local area networks (LANs), wide area networks (WANs), cellular networks, the Internet, and the like.

Within operating environment 100 is a trusted environment 102 and an untrusted environment 104. Trusted environment 102 represents a portion of operating environment 100 that is, at least, partially partitioned from other portions of operating environment 100, such as untrusted environment 104. By way of example, trusted environment 102 may be partitioned or segmented from other portions of operating environment 100 using physical barriers (e.g., fences), logical barriers (e.g., firewalls), and the like. Through such partitioning, trusted environment 102 and untrusted environment 104 may implement different security measures providing different levels of protection for data stored and/or communicated within each respective environment. As a result, a likelihood that an unauthorized person is able to compromise data stored and/or communicated within each respective environment of operating environment 100 may be different.

For example, trusted environment 102 may implement security measures that provide a greater level of protection for data stored and/or communicated within trusted environment 102 than is provided by security measures implemented by untrusted environment 104 for data stored and/or communicated within untrusted environment 104. In this example, an unauthorized person would be more likely to compromise data stored and/or communicated within untrusted environment 104 than they would data stored and/or communicated within trusted environment 102. By extension, if such data included sensitive data, an unauthorized person would likewise be more likely to compromise sensitive data stored and/or communicated within untrusted environment 104 than they would sensitive data stored and/or communicated within trusted environment 102.

As used herein, "sensitive data" refers to any information concerning an entity that may subject the entity to heightened risk or loss of an advantage if compromised, lost, or inadvertently disclosed through unauthorized access. Examples of sensitive data include: credential information (e.g., password, user name, etc.); personally identifiable information ("PII") (e.g., social security numbers, passport numbers, etc.); electronic Personal Health Information ("PHI"); financial data (e.g., credit card numbers, bank account numbers, etc.).

In operating environment 100, tokenization is implemented to minimize the exposure of sensitive data to unauthorized persons in untrusted environment 104, as described in greater detail below. To that end, computing devices within untrusted environment 104, such as client device 110 and computing device 120, submit tokenization requests including sensitive data to token server 130. In response to such tokenization requests, token server 130 returns tokens. Generally, a "token" refers to non-sensitive data lacking any extrinsic meaning or value that serves as a proxy for associated sensitive data. Examples of suitable values for implementing tokens include: numeric values, alphabetic values, alphanumeric values, and the like.

By way of example, client device 110 may need to exchange credit card information with computing device 120 during a transaction. To minimize exposure of the credit card information to unauthorized persons in untrusted environment 104, client device 110 may submit a tokenization request to token server 130. The tokenization request submitted by client device 110 may include the credit card information. In response to the tokenization request, client device 110 may receive a tokenization response from token server 130 comprising a token mapped to the credit card information. The token that client device 110 receives serves as a proxy for the credit card information. Instead of transmitting the credit card information to computing device 120, client device 110 transmits the token as a proxy for the credit card information.

In operating environment 100, a computing device may transmit a detokenization request including a token to token server 130 to retrieve sensitive data associated with the token. In response to the detokenization request, the computing device 120 may receive a detokenization response from token server 130. The detokenization response that computing device 120 receives comprises a particular instance of sensitive data associated with the token by mapping data 152 stored in database 150 that uniquely associates each token with a particular of sensitive data. In an embodiment, database 150 provides exclusive storage for mapping data in operating environment 100.

Continuing with the example above, computing device 120 may transmit a detokenization request to token server 130 that includes the token received from client device 110. In response to the detokenization request, token server 130 may transmit a detokenization response to computing device 120 that includes the credit card information that was included in the tokenization request submitted by client device 110.

In some embodiments, token server 130 may interact with HSM 140 to perform cryptographic operations on various data exchanged or stored within operating environment 100. For example, token server 130 may transmit an encryption request including data (e.g., sensitive data) to HSM 140. In response, HSM 140 may perform a cryptographic operation on the data included in the encryption request to generate encrypted data. Token server 130 may then receive an encryption response including the encrypted data from HSM 140.

One skilled in the art may recognize that an HSM describes specialized circuitry (e.g., a cryptoprocessor) that is optimized to perform hardware-based cryptographic operations. Such cryptographic operations include encryption operations and decryption operations. An encryption operation involves applying source data and a key to an input of an encryption algorithm to produce encrypted data on an output of the encryption algorithm. A decryption operation involves applying encrypted data and a key to an input of a decryption algorithm to produce the source data. Examples of algorithms suitable for implementing the encryption algorithm and/or the decryption algorithm include: Advanced Encryption Standard (AES) algorithms; Data Encryption Standard (DES) algorithms; Digital Signature Algorithm (DSA) algorithms; Rivest-Shamir-Adleman (RSA) algorithms; and the like.

Figure 2A:
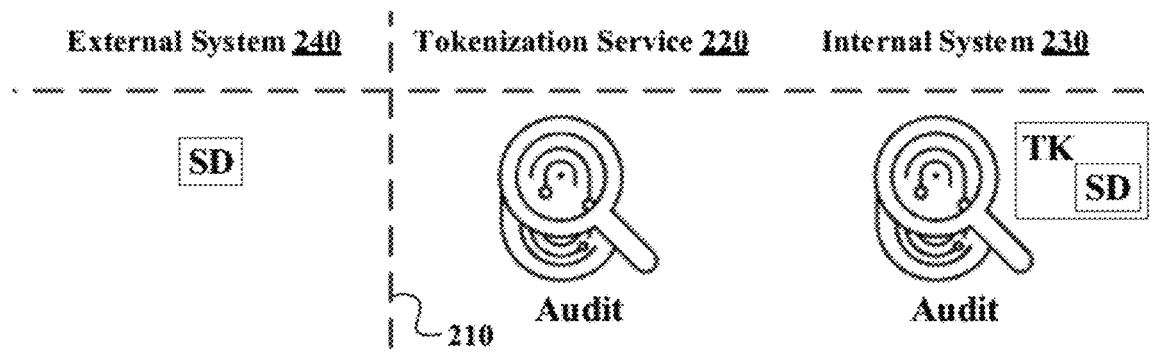
FIGS. 2A and 2B illustrate a high-level overview of segmenting elements within a trusted environment, in accordance with an embodiment of the present invention.
Figure 2B:
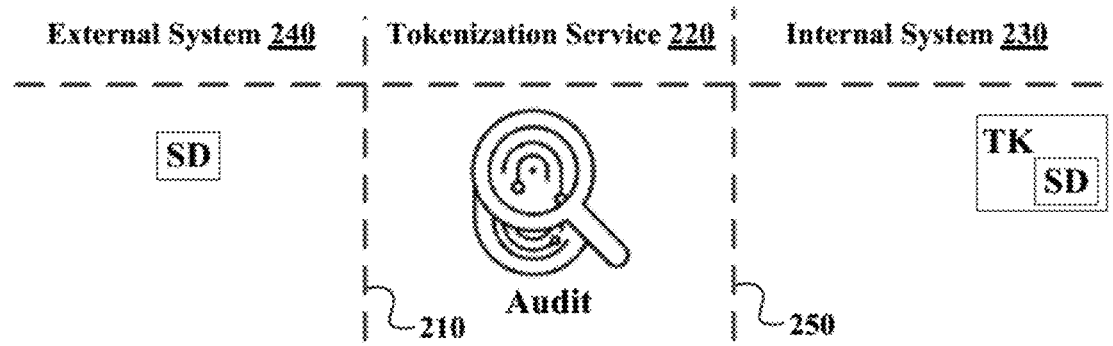

As noted above, trusted environment 102 may implement security measures that facilitate data security within trusted environment 102. In an embodiment, one such security measure comprises segmenting elements of trusted environment 102 from other elements of trusted environment 102. FIGS. 2A and 2B illustrate a high-level, conceptual overview of such segmentation. In FIGS. 2A and 2B, partition 210 segments elements of a trusted environment comprising tokenization service 220 and internal system 230 from elements of an untrusted environment comprising external system 240. As such, partition 210 may represent one or more physical partitions and/or logical partitions that segment trusted environment 102 from untrusted environment 104 in operating environment 100. The segmentation provided partition 210 improves security of data within the trusted environment by limiting access to that data by elements of the untrusted environment, such as external system 240.

Additional data security within the trusted environment may be achieved by implementing a security measure that limits access to sensitive data by elements of the trusted environment. To that end, partition 250 may be implemented to segment tokenization service 220 from internal system 230, as illustrated by FIG. 2B. Partition 250 provides additional data security within the trusted environment by isolating elements involved in generating tokens (e.g., tokenization service 220) from other elements of the trusted environment that may utilize tokens (e.g., internal system 230). Such isolation may also reduce a number of elements within the trusted environment that are subject to audit when the sensitive data is subject to regulatory compliance.

For example, partition 250 was not implemented in FIG. 2A to segment tokenization service 220 from internal system 230. Absent the isolation provided by partition 250, internal system 230 may be subject to audit in FIG. 2A due to the presence of sensitive data within tokens processed by internal system 230. In contrast, partition 250 was implemented in FIG. 2B to segment tokenization service 220 from internal system 230. Notwithstanding the presence of sensitive data within tokens processed by internal system 230, partition 250 provides isolation in FIG. 2B that may exclude internal system 230 from being subject to regulatory compliance. As such, internal system 230 may not be subject to audit in FIG. 2B.

Continuing with the example discussed above with respect to FIG. 1, trusted environment 102 may represent an e-commerce platform. In this instance, client device 110 may submit the credit card information as part of a transaction conducted with the e-commerce platform. One skilled in the art may recognize that the PCI Security Standards Council establishes regulatory guidelines (e.g., the PCI Data Security Standard ("PCI-DSS")) that govern many such transactions involving credit card information. If the PCI-DSS governs transactions involving the credit card information submitted by client device 110, each element of trusted environment 102 may be subject to audit under the compliance framework it defines.

Under the PCI-DSS, all systems that store, process, or transmit cardholder data (e.g., the credit card information) are considered within the scope of PCI-DSS compliance. Tokenizing the credit card information submitted by client device 110 would likely be construed as processing cardholder data. Therefore, token server 130 would likely be considered within the scope of PCI-DSS compliance, and thus subject to audit. Database 150 would likewise be considered within the scope of PCI-DSS compliance and subject to audit if the credit card information is included in mapping data 152.

In some instances, encrypting cardholder data is sufficient to render the cardholder data out of scope for PCI-DSS compliance. As such, internal system 160 may be considered out of scope for PCI-DSS compliance if token server 130 submits the credit card information to HSM 140 to encrypt as part of the tokenization process prior to forwarding the resulting token to internal system 160 for further processing of the transaction. However, the PCI-DSS considers encrypted cardholder data within the scope of PCI-DSS compliance when it is present in the same environment as the decryption key. As such, the PCI-DSS would likely require the e-commerce platform (represented by trusted environment 102) to implement a partition between HSM 140 and internal systems 160 similar to partition 250 of FIG. 2B for internal system 160 remain out of scope for PCI-DSS compliance. Absent such isolation internal system 160 would likely be considered within the scope of PCI-DSS compliance by processing the token comprising the encrypted credit card information, and thus subject to audit.

Each of the systems shown in FIG. 1 may be implemented via any type of computing system, such as computing system 1200 (also referred to as computer system 1200) described in greater detail below with respect to FIG. 12. Each system shown in FIG. 1 may comprise a single device or multiple devices cooperating in a distributed environment. For instance, token server 130, HSM 140, database 150, and/or internal system 160 may be provided via multiple devices arranged in a distributed environment that collectively provide the functionality described herein. Additionally, other components not shown may also be included within the distributed environment.

Figure 3:
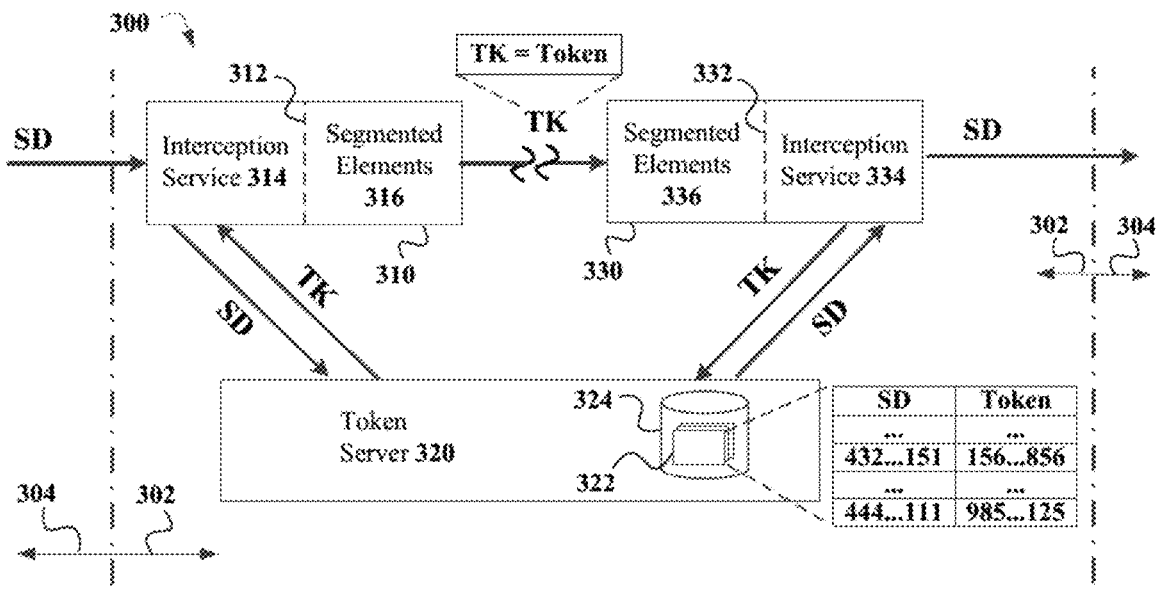
FIG. 3 is a block diagram of an example system for segmenting elements within a trusted environment using centralized tokenization services.

FIG. 3 is a block diagram of an example system 300 for segmenting elements within a trusted environment 302 using centralized tokenization. In FIG. 3, nodes 310 and 330 generally represent endpoints of trusted environment 302. Sensitive data is received from elements of an untrusted environment 304 via node 310 and is returned to elements of the untrusted environment 304 via node 330. To facilitate a reduction in the number of elements within trusted environment 302 that have access to sensitive data, node 310 implements partition 312 and node 330 implements partition 332. In an embodiment, trusted environment 302 and untrusted environment 304 are implemented with trusted environment 102 and untrusted environment 104 of FIG. 1, respectively.

Node 310 comprises a data flow processing unit for processing data received from elements of untrusted environment 304 that intervenes between partition 312 and untrusted environment 304. In FIG. 3, that data flow processing unit comprises an interception service 314. Interception service 314 is configured to submit tokenization requests comprising the sensitive data received from elements of untrusted environment 304 to token server 320. In response to each tokenization request, interception service 314 receives a tokenization response comprising a token generated by token server 320 for sensitive data included in that tokenization request. Tokens generated by token server 320 are communicated from interception service 314 to other elements (e.g. segmented elements 316 and/or 336) of trusted environment 302 via partition 312 for further processing.

Node 330 comprises a data flow processing unit for processing data received from elements of untrusted environment 304 that intervenes between partition 332 and untrusted environment 304. In FIG. 3, that data flow processing unit comprises an interception service 334. Interception service 334 is configured to submit detokenization requests to token server 320 comprising tokens received from other elements (e.g., segmented elements 316 and/or 336) of trusted environment 302 via partition 332. In response to each detokenization request, interception service 334 receives a detokenization response from token server 320 comprising a particular instance of sensitive data mapped to a given token included that detokenization request. Interception service 314 communicates each instance of sensitive data received from token server 320 to untrusted environment 304 based on address information that interception service 314 receives with a corresponding token.

In processing tokenization and detokenization requests received from endpoints of trusted environment 302, token server 320 provides trusted environment 302 with centralized tokenization. One aspect of centralizing tokenization in trusted environment 302 is that any mapping data involved in processing tokenization and detokenization requests may be localized at token server 320. As a result, trusted environment 302 may limit such mapping data to the mapping data 322 stored in database 324. In doing so, trusted environment 302 may reduce or eliminate data replication operations that some decentralized tokenization implementations effectuate to ensure that consistent mapping data is available at each location where tokenization and detokenization operations occur.

Another aspect of centralizing tokenization is that each tokenization or detokenization operation involves a roundtrip communication between a node of trusted environment 302 and token server 320. As a result, any sensitive data-related communications between trusted environment 302 and untrusted environment 304 incur processing delays arising from such roundtrip communications between token server 320 and a node of trusted environment 302. Another result of token server 320 being involved in each tokenization or detokenization operation is that token server 320 represents a single point of failure for tokenization within trusted environment 302. That is, if token server 320 becomes inoperable, tokenization within trusted environment 302 may cease.

Figure 4:
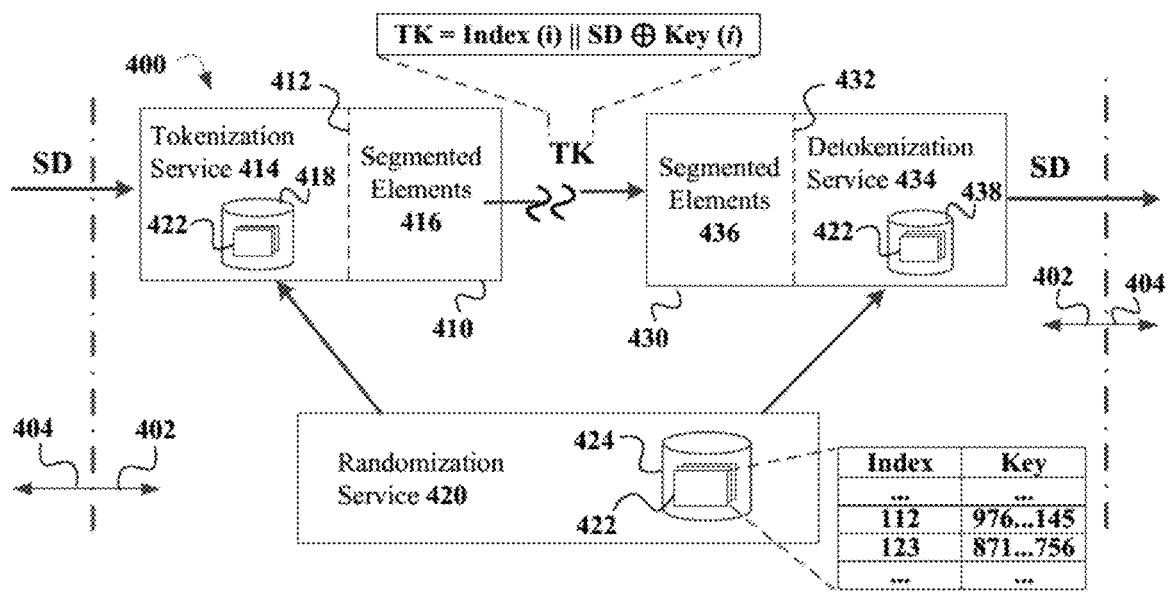
FIG. 4 is a block diagram of an example system for segmenting elements within a trusted environment using decentralized tokenization services.

FIG. 4 is a block diagram of an example system 400 for segmenting elements within a trusted environment 402 using decentralized tokenization. In FIG. 4, nodes 410 and 430 generally represent endpoints of trusted environment 402. Sensitive data is received from elements of an untrusted environment 404 via node 410 and is returned to elements of the untrusted environment 404 via node 430. To facilitate a reduction in the number of elements within trusted environment 402 that have access to sensitive data, node 410 implements partition 412 and node 430 implements partition 432.

A comparison between FIG. 3 and FIG. 4 illustrates that, unlike trusted environment 302 in which token server 320 provides centralized tokenization, trusted environment 402 implements decentralized tokenization. To that end, node 410 comprises a tokenization server 414 that intervenes between partition 412 and untrusted environment 404. Tokenization service 414 is configured to generate tokens for sensitive data received from elements of untrusted environment 404 using mapping data 422 created with set(s) of index-key pairs generated by randomization service 420, as described in greater detail below. In an embodiment, randomization service 420 is implemented using a random number generator. Tokens generated by tokenization service 414 to other elements (e.g. segmented elements 416 and/or 436) of trusted environment 402 via partition 412 for further processing.

Node 430 comprises a detokenization service 434 that intervenes between partition 432 and untrusted environment 404. Detokenization service 434 is configured to detokenize each token received from other elements (e.g., segmented elements 416 and/or 436) of trusted environment 402 via partition 432 using mapping data 422 to obtain a particular instance of sensitive data associated with that token, as described in greater detail below. Detokenization service 434 communicates each instance of sensitive data to untrusted environment 404 based on address information that detokenization service 434 receives with a corresponding token.

One aspect of decentralizing tokenization is that tokenization or detokenization operations are processed locally at endpoints of trusted environment 402 thereby avoiding any roundtrip communications between nodes of trusted environment 402 and a centralized token server. As a result, propagation delays of sensitive data-related communications between trusted environment 402 and untrusted environment 404 are less than those incurred by sensitive data-related communications involving trusted environment 302.

Another result of decentralizing tokenization is that trusted environment 402 minimizes a likelihood of single point failures. While randomization service 420 may represent a single point of failure for tokenization within trusted environment 402, that risk is minimized by preloading mapping data 422 in databases (e.g., databases 418 and/or 438) accessible to endpoints of trusted environment 402. That is, if randomization service 420 preloads mapping data 422 in those databases before tokenization or detokenization operations are processed, tokenization within trusted environment 402 may continue if randomization service 420 subsequently becomes inoperable.

Notably, trusted environment 402 implements an additional layer of isolation between segmented elements and sensitive data beyond implementing partitions 412 and 432 on nodes 410 and 430, respectively. That additional layer of isolation relates to the content of mapping data 422. In particular, mapping data 422 is devoid of any sensitive data. Rather, mapping data 422 is created using a set of index-key pairs generated by randomization service 420 with each index-key pair defining a particular index value mapped to a particular random key value. In an embodiment, randomization service 420 comprises a read privilege that prevents randomization service 420 from accessing transaction data (e.g., transaction data being processed by segmented elements of trusted environment 402). In an embodiment, randomization service 420 is configured to periodically push sets of index-key pairs to nodes 410 and 430.

A "random key value" generally refers to unpredictable values derived using an output of a randomization source, such as a random number generator. In embodiments, random key values may be implemented as: numeric values, alphabetic values, alphanumeric values, and the like. An "index value" generally refers to non-sensitive data identifying a location of a data structure comprising that index value in which a corresponding random key value resides.

Figure 5:
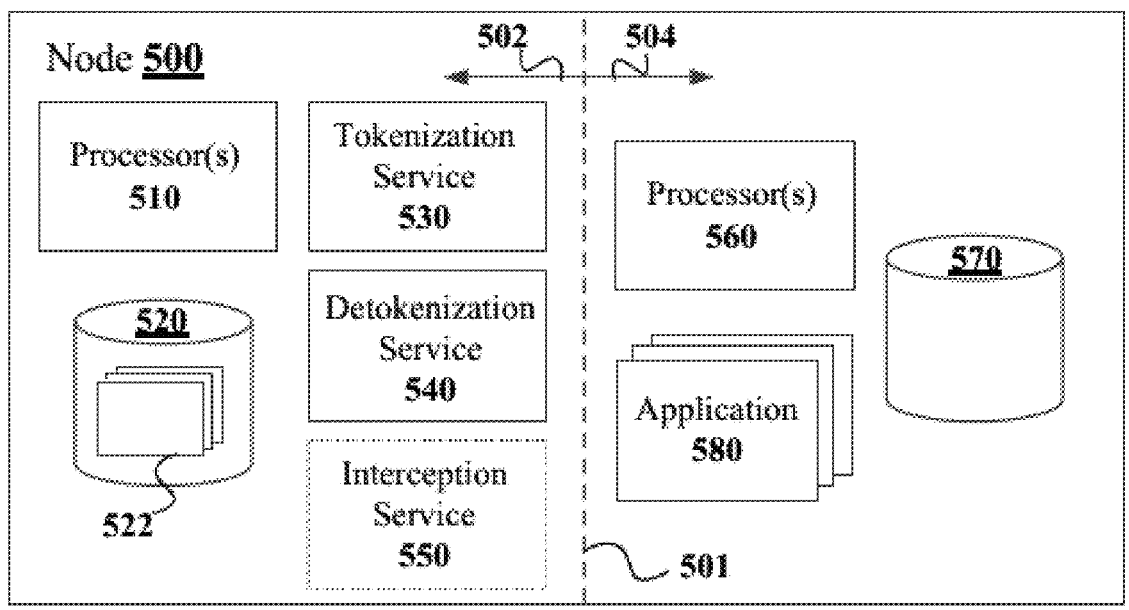
FIG. 5 is a block diagram of an example node that is suitable for implementing aspects of the invention described herein.

FIG. 5 is a block diagram of an example node 500 that is suitable for implementing aspects of the invention described herein. In an embodiment, nodes 410 and/or 430 of FIG. 4 may be implemented using node 500. Node 500 generally includes a first set of computing resources arranged as non-segmented elements 502 and a second set of computing resources arranged as segmented elements 504. The first set of computing resources include processor (or execution core) 510 and memory 520. The second set of computing resources include processor 560 and memory 570.

Node 500 is configured to implement a partition 501 to physically and/or logically isolate the first set of computing resources from the second set of computing resources. By way of example, logical isolation may be implemented using virtualization techniques. An example of physical isolation includes providing a first computing device (or server) comprising the first set of computing resources and a second computing device comprising the second set of computing resources with one or more physical barriers intervening between the first computing device and the second computing device.

Instructions stored in memory 520 upon execution by processor 510 implement a number of services, processes, or routines. Those services include: tokenization service 530, detokenization service 540, and optionally interception service 550. Tokenization service 530 is configured to generate tokens for sensitive data received from elements of an untrusted environment (e.g., client device 110 of FIG. 1) using mapping data 522 generated by a randomization service (e.g., randomization service 420 of FIG. 4) external to node 500, as discussed in greater detail below. Detokenization service 540 is configured to detokenize each token received from other elements of a trusted environment (e.g., trusted environment 402) comprising node 500 via partition 501 using mapping data 522, as described in greater detail below. Optional interception service 550 generally represents any data flow processing unit for processing data-in-transit received from elements of an untrusted environment and/or for processing data received from other elements of a trusted environment via partition 501. In an embodiment, optional interception service 550 is configured to detect sensitive data within data-in-transit received from elements of an untrusted environment and/or tokens within data received from other elements of a trusted environment via partition 501. In an embodiment, optional interception service 550 may be implemented at a transport layer of a network stack effectuated by node 500. In an embodiment, optional interception service 550 may be implemented as a packet sniffer.

Instructions stored in memory 570 upon execution by processor 560 implement a number of services, processes, or routines. Those services include an application 580 configured to consume tokens generated by a tokenization service (e.g., tokenization service 530) in effectuating transactions involving sensitive data. Continuing with the example discussed above with reference to FIG. 1 involving a client device submitting credit card information to an e-commerce platform related to a transaction, application 580 may represent a payment application of the e-commerce platform. In this example, application 580 may receive a token generated for the credit card information, as part of the transaction.

Using the token, application 580 may interact with a payment processing network (and/or an issuer system) to request authorization to proceed with the transaction. Such interaction may include application 580 transmitting an authorization request message comprising the token to the payment processing network. In an embodiment, a detokenization service (e.g., detokenization service 540) may detokenize the token in the authorization request message and replace it with the credit card information. In an embodiment, the credit card information in the authorization request message is replaced with a new token generated in accordance with a tokenization process established by the payment processing network prior to transmission.

Figure 6:
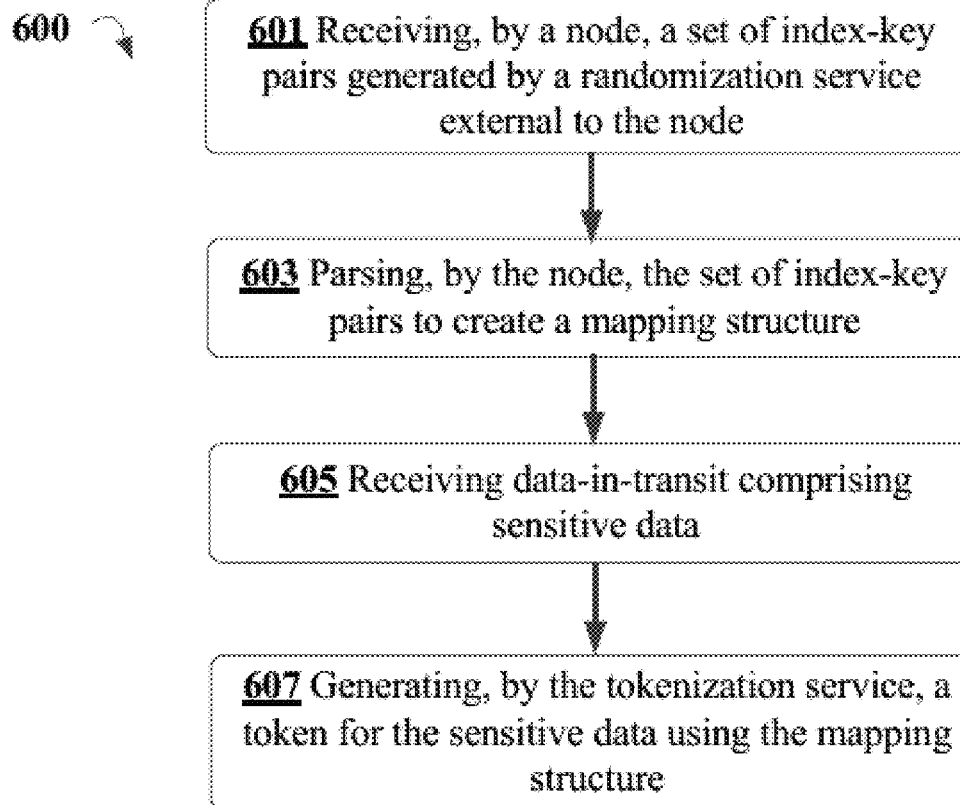
FIG. 6 is a flowchart illustrating an example of a method of providing decentralized tokenization with mapping data devoid of sensitive data, in accordance with an embodiment of the invention.

FIG. 6 is a flowchart illustrating an example of a method 600 of providing decentralized tokenization with mapping data devoid of sensitive data, in accordance with an embodiment of the invention. In an embodiment, method 600 is implemented by nodes 410 or 430 of FIG. 4; or node 500 of FIG. 5. At step 601, a node receives a set of index-key pairs generated by a randomization service external to the node. Each index-key pair in the set of index-key pairs defines a particular index value mapped to a particular random key value. At step 603, the node creates a mapping structure using the set of index-key pairs. By way of example and with reference to FIG. 4, mapping data 422 is created with a set of index-key pairs comprising a first index-key pair that includes index value "112" mapped to random key value "976 . . . 145" and a second index-key pair that includes index value "123" mapped to random key value "871 . . . 756". In an embodiment, the node parses the set of index-key pairs to create the mapping structure.

At step 605, data-in-transit comprising sensitive data is received. One skilled in the art will appreciate that data generally exists in three states: data-in-use, data-at-rest, and data-in-transit. Data-in-use generally refers to data that is being processed by one or more services, processes, or routines (e.g., application 580 of FIG. 5) executing or running on a processor (e.g., processor 560). Data-at-rest generally refers to data that is stored on a computer-readable storage medium (e.g., memory 520 and/or memory 570) and is not being processed by one or more services, processes, or routines executing or running on a processor. Examples of data-at-rest include data residing or stored on: a hard drive, network attached storage, a cloud-based storage device, and the like. Data-in-transit generally refers to data that is being propagated or transferred over a communication medium. Examples of data-in-transit include data being propagated over: a wired or wireless communication path from a first computing device to a second computing device, a service bus during an input/output operation, and the like. In an embodiment, receiving the data-in-transit comprises a data flow processing unit of the node for processing the data-in-transit, detecting the sensitive data within the data-in-transit. In an embodiment, the data flow processing unit of the node is implemented as an interception service. In an embodiment, the node comprises memory resources storing data-at-rest and the sensitive data is absent from the data-at-rest.

At step 607, a tokenization service of the node generates a token for the sensitive data using the mapping structure. In an embodiment, the mapping structure comprises a plurality of index values. In an embodiment, generating the token comprises randomly selecting an index value from among the plurality of index values. In an embodiment, generating the token further comprises performing an invertible operation on the sensitive data and a random key value mapped to the index value in the mapping structure to generate the token. In an embodiment, generating the token further comprises concatenating or appending the randomly selected index value to an output of the invertible operation.

Continuing with the example discussed above with reference to FIG. 4, the tokenization service may randomly select index value "123" from mapping data 422. In that instance, the tokenization service may then perform an invertible operation on the sensitive data and random key value "871 . . . 756". Index value "123" may be concatenated to an output of the invertible operation to generate the token.

In general, an invertible operation is defined using: let $\mathfrak{T}$ be a set and let $f: \mathfrak{T} \times \mathfrak{T} \to \mathfrak{T}$ be a function, then:

$$\forall a, b, c \in \mathcal{I} \mid f(a, b) = c, \exists g, h: \mathcal{I} \times \mathcal{I} \to \mathcal{I} \mid g(a, c) = b, h(b, c) = a$$

In an embodiment, an invertible operation is defined using: let $I=\{0,1\}^l$ for some $l \in \mathbb{N}$ be the set of all binary strings of a given length and let $f: I \times I \to I$ be a function, then:

$$\forall a, b, c \in \mathcal{I}^3 \mid f(a, b) = c, \exists g, h: \mathcal{I} \times \mathcal{I} \to \mathcal{I} \mid g(a, c) = b, h(b, c) = a$$

And then, one can define a triplet (f, g, h) of operations f, g and h such that: f(a,b)=c; g(a,c)=b; h(b,c)=a; $\forall$ a, b, c $\in$ $I$; where f, g and h are invertible operations. One aspect this definition of a triplet is that if one operation among operations f, g or h is a XOR operation, then the two remaining operations should be XOR operations. In an embodiment, the invertible operation is a bitwise XOR operation.

In an embodiment, invertible operations can be used in three conditions: (i) to compute a token from sensitive data and a particular random key value mapped to a given index value in a mapping structure with a function named "f" for exemplary purposes only; (ii) to compute a particular random key value mapped to a given index value in a mapping structure from a token and sensitive data with a function named "g" for exemplary purposes only; and (iii) to compute sensitive data from a token and a particular random key value mapped to a given index value in a mapping structure with a function named "h" for exemplary purposes only. According to an embodiment, these functions f, g, h used in these three condition should be invertible and respect: f(a,b)=c; g(a,c)=b; h(b,c)=a; $\forall$ a, b, c $\in$ $I$. Accordingly, these three functions f, g and h should form one triplet, as defined above.

In one embodiment, an XOR function can be used for one of the function f, g or h so that accordingly f=g=h=XOR constitute a valid triplet as defined above. In an embodiment, if a digit-wise addition modulo 10 operation is used for f, then for g and h the digit-wise subtraction modulo 10 operation should be used, so that the three functions f, g, h also constitute a valid triplet, as defined above. In an embodiment, if a digit-wise addition modulo 10 operation is used for g, then for f and h the digit-wise subtraction modulo 10 operation should be used, so that the three functions f, g, h also constitute a valid triplet, as defined above. In an embodiment, if a digit-wise addition modulo 10 operation is used for h, then for f and g the digit-wise subtraction modulo 10 operation should be used, so that the three functions f, g, h also constitute a valid triplet, as defined above.

In an embodiment, generating the token further comprises querying a blacklist structure of the node associated with the mapping structure to identify a status of the index value. In an embodiment, method 600 further comprises synchronizing a blacklist structure of the node with a copy of the blacklist structure residing in memory resources of another node external to the node. In an embodiment, synchronization of the blacklist structure is performed in a low priority and/or non-blocking fashion mode. In this embodiment, a single index value (and associated random key value) may potentially be used in generating multiple tokens before synchronization occurs. In that instance each token would be considered valid and function properly. One potential risk of using a single index value and associated random key value to generate multiple tokens is that sensitive data associated with each token may become compromised by an unintended recipient with knowledge of token structure and access to each token.

In an embodiment, method 600 further comprises forwarding the token to an application interface of a process executing using a first set of computing resources that are isolated from a second set of computing resources that the node allocates to the tokenization process. In an embodiment, the application interface is an application programming interface ("API"), a library, a remote API, a Web API, or a combination thereof. In an embodiment, the first set of computing resources are allocated to the process by the node. In an embodiment, the first set of computing resources are allocated to the process by another node of a system comprising the node that is external to the node. In an embodiment, the process is implemented using segmented application 580 of FIG. 5. In an embodiment, the tokenization service and the process are implemented using tokenization service 420 and segmented elements 436 of FIG. 4, respectively.

In an embodiment, the token is forwarded to the API without storing data mapping the sensitive data to the token. In an embodiment, method 600 further comprises encrypting the token prior to forwarding the token to the API of the process. In an embodiment, the token is forwarded to the API of the process as an encrypted token and method 600 further comprises encrypting the token to obtain the encrypted token. In an embodiment, the node includes segmented resources comprising the tokenization service and an HSM (e.g., HSM 140 of FIG. 1) and encrypting the token comprises the tokenization service interacting with the HSM.

In an embodiment, method 600 further comprises configuring a detokenization service to detokenize tokens using a plurality of mapping structures associated with a plurality of epochs, as discussed below in greater detail with respect to FIG. 9. In an embodiment, the detokenization service selects a particular mapping structure from the plurality of mapping structures for detokenizing a given token using a version identifier extracted from the given token. In an embodiment, the detokenization service is effectuated by computing resources of the node. In an embodiment, the detokenization service is effectuated using computing resources of another node within a system comprising the node that is external to the node.

In an embodiment, the token is a first token and method 600 further comprises receiving a second token generated by a remote tokenization service using the mapping structure. In an embodiment, the remote tokenization service executes on computing resources external to the node. In an embodiment, method 600 further comprises decrypting the second token to obtain a decrypted second token. In an embodiment, method 600 further comprises extracting a version identifier associated with the mapping structure from the decrypted second token. In an embodiment, method 600 further comprises detokenizing the decrypted second token using an index value extracted from the decrypted second token and a random key value mapped to the index value in the mapping structure.

In an embodiment, method 600 is performed by processing logic, including hardware, firmware, software, or a combination thereof. In an embodiment, method 600 is performed by a processor executing code stored in a non-transitory computer-readable medium (e.g., a memory).

Figure 7:
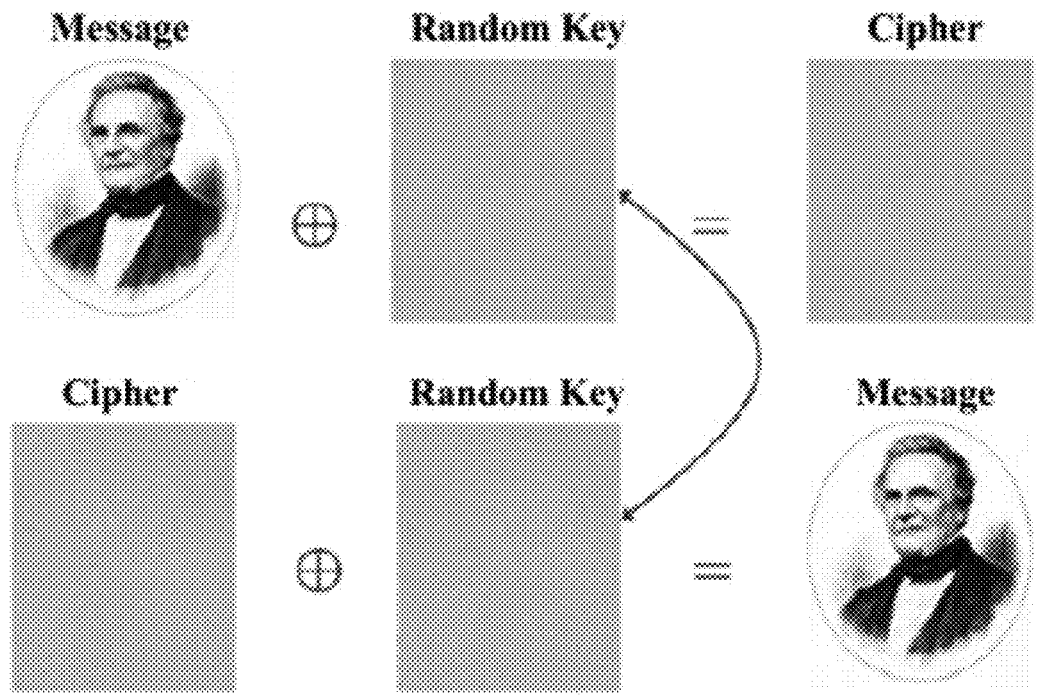
FIG. 7 illustrates a conceptual, high-level overview of deterministic encryption.

FIG. 7 illustrates a high-level overview of an example deterministic encryption scheme. In FIG. 7, a plaintext message and a random key are provided to an encryption algorithm to produce ciphertext. An intended recipient may recover the plaintext message by providing the random key and the ciphertext to a decryption algorithm. The ciphertext lacks any value to an unintended recipient as long as the random key used to produce the ciphertext remains secure. However, if the random key becomes compromised, each instance of ciphertext subsequently produced with the random key becomes compromised. Specifically, an unintended recipient may provide the compromised random key and a given instance of ciphertext to a decryption algorithm to recover a corresponding plaintext message.

Figure 8:
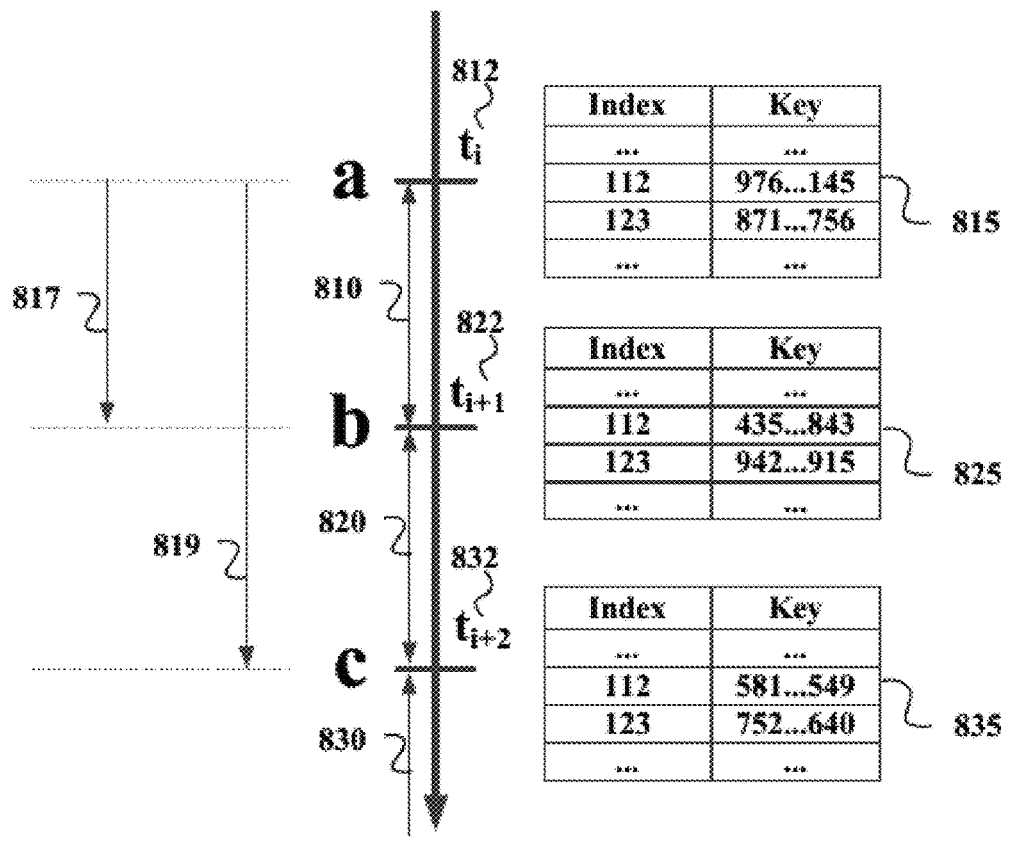
FIG. 8 depicts a timeline showing periodic refreshing of mapping structures, in accordance with an embodiment of the present invention.

Additional security for sensitive data may be achieved by implementing a security measure that periodically refreshes mapping structures used to generate tokens, as illustrated by FIG. 8. Periodically refreshing of mapping structures reduces a risk of the tokens being compromised from sets of index-key pairs comprising such mapping becoming compromised. In FIG. 8, a plurality of pre-defined times is represented along a timeline by designators 812, 822, and 832. Those plurality of pre-defined times partition the timeline into a plurality of time periods (or epochs) represented by designators 810, 820, and 830.

Each epoch among the plurality of epochs has a duration defined by its associated start time and a start time of an epoch immediately following that epoch. For example, first epoch 810 has a duration defined by start time 812 and start time 822 of second epoch 820. As another example, second epoch 820 has a duration defined by start time 822 and start time 832 of third epoch 830. In an embodiment, first epoch 810, second epoch 820, and third epoch 830 have equivalent durations. In an embodiment, the duration of first epoch 810 is different from the respective durations of second epoch 820 and third epoch 830.

Over a duration of a given epoch, that epoch is identified as a "current epoch". When the duration of the given epoch concludes at the start time of the epoch immediately following the given epoch, a new epoch (e.g., the epoch immediately following the given epoch) is identified as the current epoch. For example, a first trigger may be issued when a background process of a node (e.g., nodes 410, 430, or 500) determines that a current system time corresponds to start time 812 of first epoch 810. At start time 812, first epoch 810 is identified as a current epoch. In response to the first trigger, the node configures a tokenization service (e.g., tokenization service 414 of FIG. 4 and/or tokenization service 530 of FIG. 5) to tokenize sensitive data using first mapping structure 815. As noted above, the use of system time sources to periodically refresh mapping structures facilitates the ephemeral nature of each set of index-key pairs comprising such mapping structures. To that end, each set of index-key pairs comprising first mapping structure 815 has a usable life defined by first epoch 810. In one respect, first epoch 810 defines that usable life through the node configuring the tokenization service to tokenize sensitive data using first mapping structure 815 for a duration 817 of first epoch 810.

A second trigger may be issued when the background process determines that the current system time corresponds to start time 822 of second epoch 820 and second epoch 820 is identified as the current epoch. In response to the second trigger, the node configures the tokenization service to tokenize sensitive data for a duration of second epoch 820 using second mapping structure 825. Upon configuring the tokenization service to tokenize sensitive data using second mapping structure 825, the tokenization service no longer tokenizes sensitive data using first mapping structure 815. However, first mapping structure 815 remains usable by other services during second epoch 820. For example, a detokenization service of the node (or another node of a system comprising the node) may be configured to detokenize using first mapping structure 815 for duration 819.

As illustrated by FIG. 8, each mapping structure includes a different set of index-key pairs. For example, first mapping structure 815, index value "112" is mapped to random key value "976 . . . 154". However, in second mapping structure 825, index value "112" is mapped to random key value "435 . . . 843". This illustrates another aspect of the present disclosure in which mapping structures are versioned. In the example of FIG. 8, that versioning of mapping structures is represented by the lowercase letters associated with each epoch start time. For example, first epoch 810 is associated with version "a", second epoch 820 is associated with version "b", and third epoch 830 is associated with version "c". In an embodiment, each token generated by a mapping structure comprising index-key pairs includes a version identifier indicative of a version associated with an epoch in which that token was generated.

One skilled in the art may recognize that version identifiers can take other forms and be incorporated into ephemeral tokens in other ways. For example, version identifiers may be implemented as one or more values comprising: numeric values, alphabetic values, alphanumeric values, and the like. As another example, version identifiers may be incorporated into tokens by appending version identifiers as a suffix to each token or by inserting version identifiers within a sequence of values forming each token. As another example, version identifiers may be incorporated into tokens by appending version identifiers as a prefix to each token.

In an embodiment, a form of version identifier used in one epoch may be different from a form of version identifier used in another epoch. In an embodiment, version identifiers may be incorporated into tokens in a first manner for one epoch whereas version identifiers may be incorporated into tokens in a second manner that is different from the first manner for another epoch. In this embodiment, it remains possible to identify a respective version identifier of each token received regardless of which manner that version identifier was incorporated into that token.

Such mapping structure versioning represents a means through which an epoch defines a usable life of each set of index-key pairs comprising a given mapping structure. For example, a third trigger may be issued when the background process determines that the current system time corresponds to start time 832 of third epoch 830 and third epoch 830 is identified as the current epoch. In response to the third trigger, the node configures the tokenization service to tokenize sensitive data for a duration of third epoch 830 using third mapping structure 835.

Upon configuring the tokenization service to tokenize sensitive data using third mapping structure 835, the tokenization service no longer tokenizes sensitive data using second mapping structure 825. However, a detokenization service (e.g., detokenization service 434 of FIG. 4 and/or detokenization service 540 of FIG. 5) may be configured to detokenize tokens using second mapping structure 825 for the duration of third epoch 830. As illustrated in FIG. 8, the detokenization service may also be configured to detokenize tokens using third mapping structure 835 for the duration of third epoch 830. One aspect of the detokenization service detokenizing tokens using second mapping structure 825 and/or third mapping structure 835 for the duration of third epoch 830 is that tokens generated during the second epoch 820 and/or third epoch 830 may be received by the detokenization service during third epoch 830. In an embodiment, the detokenization service is configured to identify a particular epoch in which a given token is generated using a version identifier of the given token. In an embodiment, the given token is encrypted, and the detokenization service is configured to interact with an HSM (e.g., HSM 140 of FIG. 1) to decrypt the given token to obtain a decrypted token.

Another aspect of the present disclosure illustrated by FIG. 8 is that mapping structure versions may be cyclically reused over time. For example, prior to start time 832, the detokenization service may be configured to process detokenization requests using first mapping structure 815. Subsequent to start time 832, the detokenization process may be configured to no longer process detokenize tokens using first mapping structure 815. Yet, at a later time, a new mapping structure associated with version "a" may be created using a new set of index-key pairs generated by the randomization service for use during a later epoch.

FIGS. 9 and 10 illustrate an example of cyclically reusing mapping structure versions over time. Referring to FIG. 9, an epoch identified as a current epoch at a first time is associated with version "w". In FIG. 9, a tokenization service is configured to tokenize sensitive data included in received data-in-transit using a mapping structure associated with version "w", as represented by designator 910. At the first time, a detokenization process is configured to detokenize tokens using mapping structures associated with versions "t"-"w", as represented by designator 920.

Referring to FIG. 10, a new epoch is identified as the current epoch at a second time subsequent to the first time. That new epoch is associated with version "x". In FIG. 10, the tokenization service is configured to tokenize sensitive data using a mapping structure associated with version "x", as represented by designator 1010. At the second time, the detokenization process is configured to detokenize tokens using mapping structures associated with versions "u"-"x", as represented by designator 1020. As illustrated by FIG. 10, neither the tokenization service nor the detokenization service is configured to process sensitive data or tokens using a mapping structure associated with version "t". This illustrates that mapping structure version "t" has been released at the second time for use at a later time.

FIG. 11 illustrates an example of sensitive data 1100 and an associated token 1150 having an equivalent number of bytes while having a dissimilar number of bits. In the example of FIG. 11, sensitive data 1100 is encoded as a string of 16 numerical digits (or bytes) that has been formatted into a first chunk 1102, a second chunk 1104, and a third chunk 1106. Upon tokenization using a mapping structure (e.g., mapping data 422 and/or 522) comprising a set of index-key values, sensitive data 1100 is transformed into associated token 1150. As seen in FIG. 11, sensitive data 1100 and token 1150 each comprise 16 bytes. However, while second chunk 1104 of sensitive data 1100 is encoded using numerical values, second chunk 1154 of token 1150 is encoded using case-sensitive alphanumeric values. One skilled in the art may recognize that the 6 numerical digits of second chunk 1104 represents $10^6$ possible permutations, which may be represented using approximately 24 bits, and the 6 case-sensitive alphanumerical digits of second chunk 1154 represents $62^6$ possible permutations, which may be represented using approximately 34 bits. As such, through encoding second chunk 1154 as case-sensitive alphanumeric digits instead of as numerical digits, second chunk 1154 comprises 10 more bits than second chunk 1104 for encoding information.

The techniques described herein for FIGS. 3-11 relate to tokenizing sensitive data and enhancing security of token mapping data. The techniques described herein for FIGS. 12-17 relate to implementing a tokenization authentication system. The described technology for the tokenization authentication system provides an authentication process of validating potentially expired tokens based on detokenizing/retokenizing sensitive data (e.g., sensitive data such as a credit card). The process provides enhanced security of mapping data based on a detokenization/tokenization algorithm that allows an application with PCI-DSS data to move to the cloud and reduce their PCI-DSS scope. For example, the tokenization authentication system may provide randomization at a first tokenization process, may be deterministic after first tokenization across datacenters (e.g., able to be detokenizable, provide same token after retokenizing same card, etc.), may be able handle a lifetime per token (e.g., same lifetime across datacenters), may be able to have generic requirements for tokens, and/or may be able to detect expired tokens. Generic requirements for tokens may include keep same size and length, contain at least one lowercase, be PCI compliant, carry Luhn information (e.g., a checksum formula used in the validation of various identification numbers such as credit card numbers, social security numbers, IMEI numbers, etc.), and the like.

More specifically, this technology includes a tokenization authentication method (e.g., a validation service) that includes receiving, by a node (from another node/device), an encrypted token that includes a first set of sensitive data (e.g., credit card info), wherein the encrypted token was generated by a randomization (tokenization) service based on a mapping structure. For example, a randomization (tokenization) service may generate a token by selecting an index value based on a pseudorandom number generator that includes an initial value (sometimes referred to herein as a seed), e.g., timestamp plus credit card information, and the like. For example, each index may define a particular value that is random. In other words, the value to be used for tokenization is the one at the row of the index in a prepopulated database, the seed/initial value may include a timestamp plus credit card information, a week number, and the like. The tokenization authentication method may further include determining, based on the encrypted token, a second set of sensitive data using a detokenization process (e.g., detokenization process decodes/decrypts the token based on using the mapping structure and an index value extracted from the token). In some implementations of the invention, the row selection is a deterministic operation based on the seed, such as a week number and a credit card number. In some implementations, only a week number may be implemented if a week is selected as a timeframe, however, credit card information being included as part of the seed would eliminate using same index for all tokenization which should be avoided for security reasons. The tokenization authentication method may further include generating, based on the second set of sensitive data, a rebuilt token using a retokenization process.

In some implementations of the invention, the tokenization authentication method may further include determining whether the encrypted token is validated based on comparing the encrypted token to the rebuilt token. For example, validation is based on the deterministic operation associated with the seed and selecting the initial value, thus determining that the rebuilt token is validated is based on row selection which may be deterministic based on the seed which is synchronized with a rate of production of tokens. In some implementations of the invention, the comparison is done within the same week of the rebuilt token, which will be the same as the first token because the row index/selection is deterministic and have used the same seed (e.g., week number plus the credit card number). The tokenization authentication method may further include, in response to determining that the encrypted token is validated, providing the sensitive data to an application interface of a process executing using a first set of computing resources that are isolated from a second set of computing resources that the node allocates to the randomization service. For example, this whole operation of testing token provides a substantive advantage because doing so you avoid injecting dummy credit card in your payment operation, the isolation between the environment where there the token is circulating and the sensitive data is, provides the advantage to avoid any sensitive data leakage.

Figure 12:
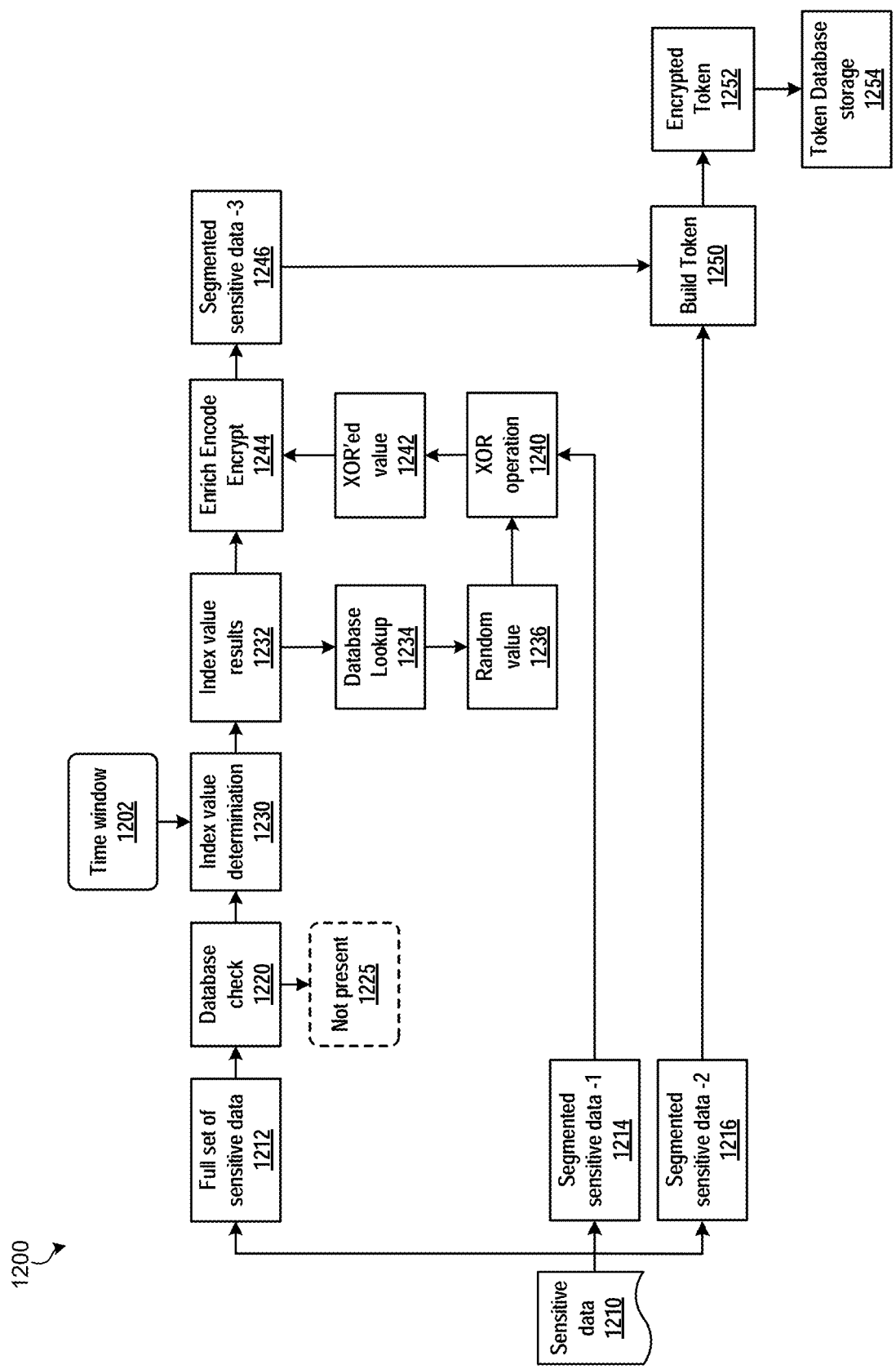
FIG. 12 is a block diagram of an example system for generating an encrypted token within a trusted environment using a tokenization service.

FIG. 12 is a block diagram of an example system for generating an encrypted token within a trusted environment using a tokenization service. In particular, FIG. 12 illustrates a flowchart of an example process 1200 of a tokenization process based on receiving sensitive data where there is not a corresponding token in the database, according to embodiments of the invention. In some implementations of the invention, the tokenization process 1200 is also referred to herein as a retokenization process. Operations of the tokenization process 1200 can be implemented, for example, by a system that includes one or more data processing apparatus, such as the token server 130 of FIG. 1 utilizing a tokenization instruction set and utilizing one or more protocols. The tokenization process 1200 can also be implemented by instructions stored on computer storage medium, where execution of the instructions by a system that includes a data processing apparatus cause the data processing apparatus to perform the operations of the tokenization process 1200.

The tokenization process 1200 begins when sensitive data 1210 is received (e.g., credit card information is received at a token server). The tokenization process 1200 segments the sensitive data and determines a full set of sensitive data 1212 (e.g., the entire credit card information such as 4974768101328835), segmented sensitive data-1 1214 (e.g., middle digits such as 810132), and segmented sensitive data-2 1216 (e.g., first six digits and the last four digits (e.g., 6×4), such as 497476 . . . 8835). After segmenting the data, the tokenization process 1200 then performs a database check 1220 to determine whether or not the sensitive data is present in the current data storage, however, as indicated by notification 1225, a token associated with the sensitive data 1210 is not present in the current data storage (e.g., a non-existing token), thus the tokenization process 1200 proceeds to build a new token.

In some implementations of the invention, the tokenization process 1200 proceeds to a index value determination 1230 based on a time window 1202 (e.g., a current time module). In implementation of the invention, as further discussed herein, the time window 1202 may be used as a synchronization aspect with other cloud datacenters such that a random value from a prepopulated database (e.g., selecting an initial value) are refreshed with a certain and same time period (e.g., one week-a seed value). For example, the index value determination 1230 may utilize a math operation and the deterministic property of a pseudo random generator with a given seed, the seed may be a week timestamp and the credit card information. The index value results 1232 of the index value determination 1230 may include an index value and a version (e.g., version 0 and index 127). For example, a randomization service (e.g., tokenization process 1200) may generate a token by selecting an index value based on a pseudorandom number generator that includes an initial value (e.g., a seed) that may include a timestamp (e.g., a week number) plus credit card information, and the like. For example, each index may define a particular value that is random. In other words, the value to be used for tokenization is the one at the row of the index in a prepopulated database, the seed/initial value may include credit card information and timestamp such as a week number, and the like. The index value results 1232 of the index value determination 1230 may then be sent to a database lookup block 1234 to look up a prepopulated random value 1236 (e.g., based on the index value and a version, e.g., version 0 and index 127).

In some implementations of the invention, the tokenization process 1200 proceeds to an XOR operation utilizing the random value 1236 (e.g., a random value such as 731547) and the segmented sensitive data-1 1214 (e.g., middle digits such as 810132) to determine an XOR'ed value 1242 (e.g., following the XOR operation between the middle digits 810132 and the random value 731547 to produce an XOR'ed value such as 488719). The XOR'ed value 1242 and the index value results 1232 are sent to an enrich encode encrypt block 1244 to determine segmented sensitive data-3 1246 (e.g., middle digits of a token such as gMSxaG).

In some implementations of the invention, the tokenization process 1200 proceeds to the build token block 1250 to combine the segmented sensitive data-3 1246 (e.g., middle digits) with the segmented sensitive data-2 1216 (e.g., first six digits and the last four digits of the sensitive data) to generate an encrypted token 1252 (e.g., a token that combines the 6×4 data with the encrypted middle digit data to produce a token such as 497476gMSxaG8835). The encrypted token 1252 may then be stored in the token database storage 1254.

Figure 13:
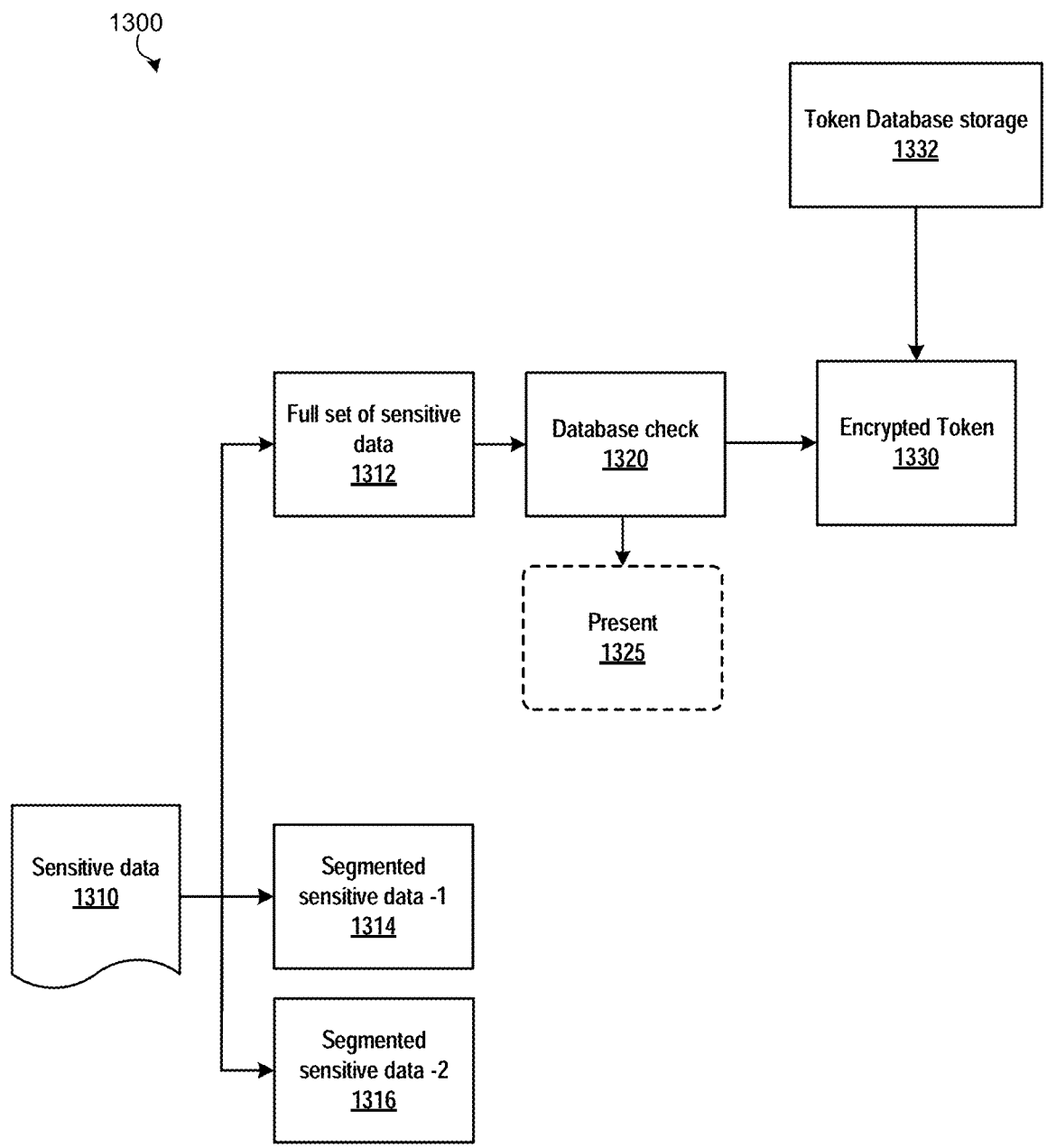
FIG. 13 is a block diagram of an example system for identifying an existing encrypted token located in a database within a trusted environment using a tokenization service.

FIG. 13 is a block diagram of an example system for identifying an existing encrypted token located in a database within a trusted environment using a tokenization service. In particular, FIG. 13 illustrates a flowchart of an example process 1300 of a tokenization process based on receiving sensitive data where there is a corresponding token in the database, according to embodiments of the invention. Operations of the tokenization process 1300 can be implemented, for example, by a system that includes one or more data processing apparatus, such as the token server 130 of FIG. 1 utilizing a tokenization instruction set and utilizing one or more protocols. The tokenization process 1300 can also be implemented by instructions stored on computer storage medium, where execution of the instructions by a system that includes a data processing apparatus cause the data processing apparatus to perform the operations of the tokenization process 1300.

The tokenization process 1300 begins when sensitive data 1310 is received (e.g., credit card information is received at a token server). The tokenization process 1300 segments the sensitive data and determines a full set of sensitive data 1312 (e.g., the entire credit card information such as 4974768101328835), segmented sensitive data-1 1314 (e.g., middle digits such as 810132), and segmented sensitive data-2 1316 (e.g., first six digits and the last four digits (e.g., 6×4), such as 497476 . . . 8835). After segmenting the data, the tokenization process 1300 then performs a database check 1320 to determine whether or not the sensitive data is present in the current data storage. As indicated by notification 1325, a token corresponding to the sensitive data 1310 is present in the current data storage (e.g., an existing token), thus the tokenization process 1300 proceeds to obtain the encrypted token 1330 from the token database storage 1332.

Figure 14:
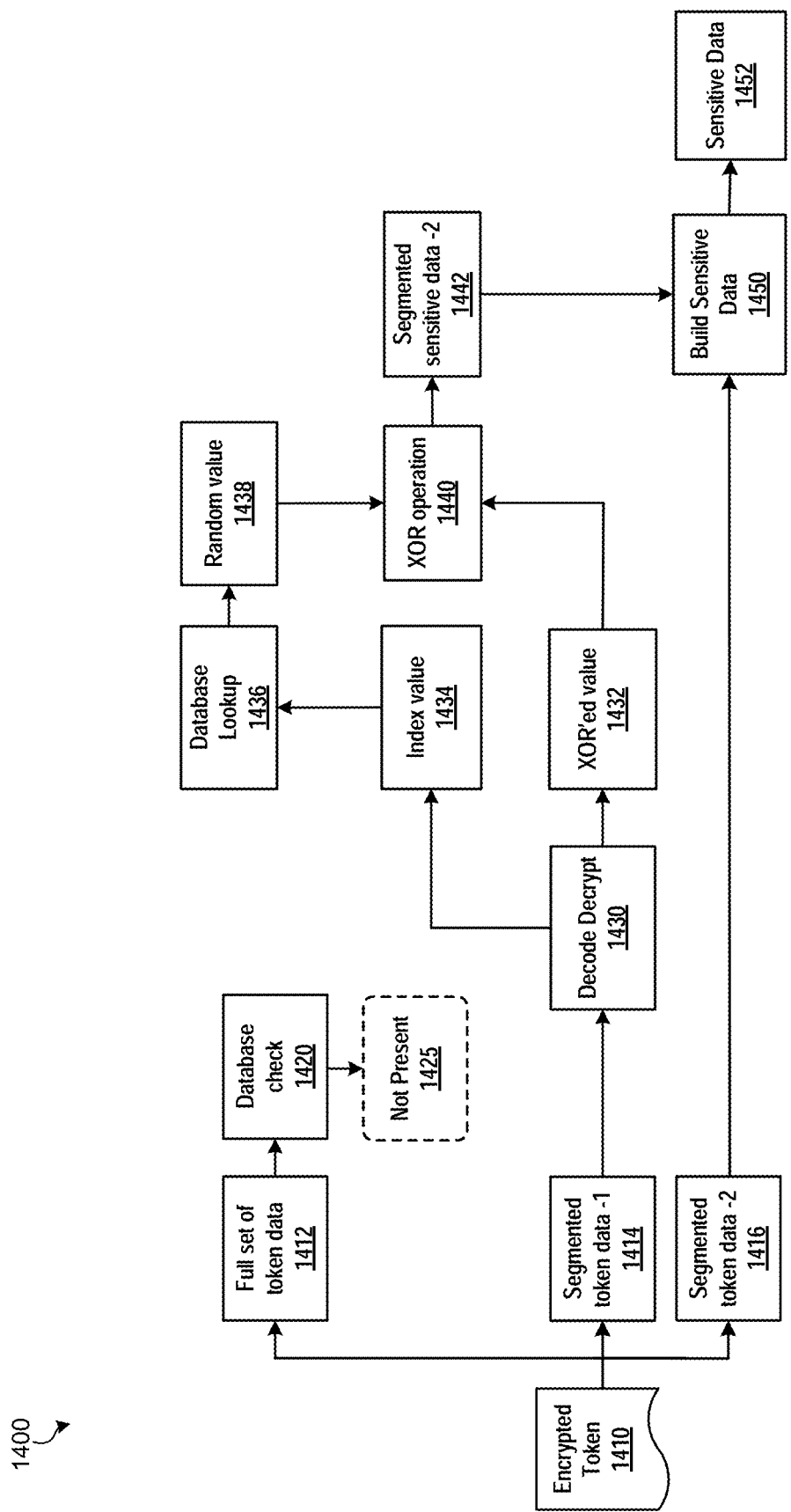
FIG. 14 is a block diagram of an example system for determining sensitive data from an encrypted token within a trusted environment using a detokenization service.

FIG. 14 is a block diagram of an example system for determining sensitive data from an encrypted token within a trusted environment using a detokenization service. In particular, FIG. 14 illustrates a flowchart of an example process 1400 of a detokenization process based on receiving sensitive data where there is not a corresponding token in the database, according to embodiments of the invention. Operations of the detokenization process 1400 can be implemented, for example, by a system that includes one or more data processing apparatus, such as the token server 130 of FIG. 1 utilizing a detokenization instruction set and utilizing one or more protocols. The detokenization process 1400 can also be implemented by instructions stored on computer storage medium, where execution of the instructions by a system that includes a data processing apparatus cause the data processing apparatus to perform the operations of the detokenization process 1400.

The detokenization process 1400 begins when an encrypted token 1410 is received (e.g., a token associated with credit card information is received at a token server). The detokenization process 1400 segments the encrypted token data and determines a full set of token data 1412 (e.g., the entire token string, such as 497476gMSxaG8835 continuing the example of FIG. 12), segmented token data-1 1414 (e.g., middle digits such as gMSxaG), and segmented token data-2 1416 (e.g., first six digits and the last four digits (6×4), such as 497476 . . . 8835). After segmenting the token data, the detokenization process 1400 then performs a database check 1420 to determine whether or not the token 1410 is present in the current data storage, however, as indicated by notification 1425, the token 1410 is not present in the current data storage (e.g., a non-existing token), thus the detokenization process 1400 proceed to determine the sensitive data from the token 1410.

In some implementations of the invention, the detokenization process 1400 proceeds to a decode decrypt analysis 1430 in order to determine the XOR'ed value (e.g., 488719) and the index value 1434 and a version (e.g., version 0 and index 127) based on the segmented token data-1 1414 (e.g., middle digits such as gMSxaG). The detokenization process 1400 may then proceed and send the index value 1434 and version to a database lookup block 1436 to look up a random value 1438 (e.g., a prepopulated random value such as 731547, based on the index value and a version, e.g., version 0 and index 127).

In some implementations of the invention, the detokenization process 1400 proceeds to an XOR operation 1440 utilizing the random value 1438 (e.g., a random value such as 731547) and the XOR'ed value 1432 (e.g., 488719) to determine segmented sensitive data-2 1442 (e.g., middle digits of the credit card information such as 810132).

In some implementations of the invention, the detokenization process 1400 proceeds to the build sensitive data block 1450 to combine the segmented sensitive data-2 1442 (e.g., middle digits of the credit card information) with the segmented token data-2 1416 (e.g., first six digits and the last four digits of the credit card information) to generate the full set of sensitive data 1452. The full set of sensitive data 1452 may then be sent to an ender user via an API.

Figure 15:
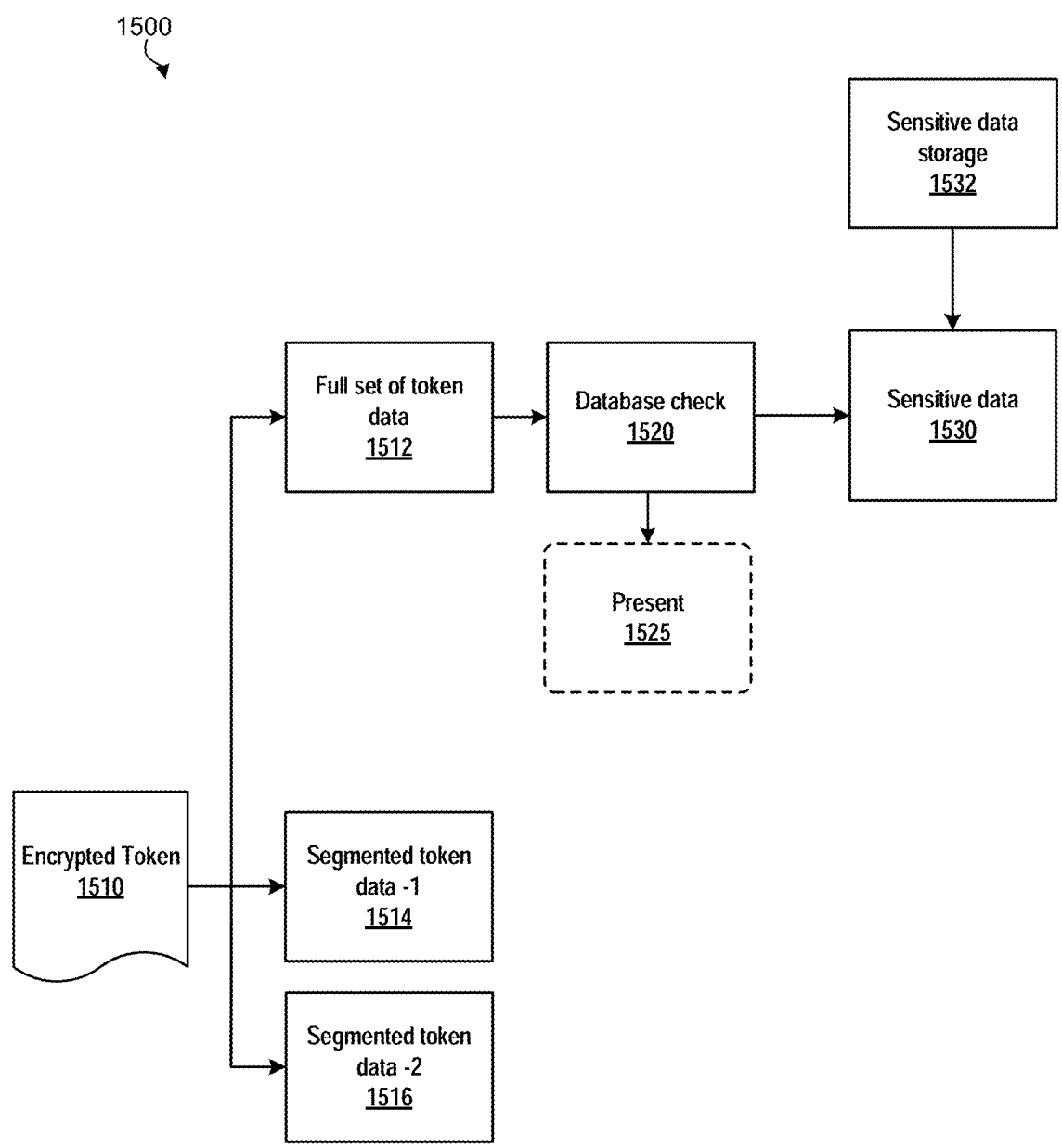
FIG. 15 is a block diagram of an example system for identifying existing sensitive data located in a database associated with an encrypted token within a trusted environment using a detokenization service.

FIG. 15 is a block diagram of an example system for identifying existing sensitive data located in a database associated with an encrypted token within a trusted environment using a detokenization service. In particular, FIG. 15 illustrates a flowchart of an example process 1500 of a detokenization process based on receiving a token where there is a corresponding token in the database, according to embodiments of the invention. Operations of the detokenization process 1500 can be implemented, for example, by a system that includes one or more data processing apparatus, such as the token server 130 of FIG. 1 utilizing a detokenization instruction set and utilizing one or more protocols. The detokenization process 1500 can also be implemented by instructions stored on computer storage medium, where execution of the instructions by a system that includes a data processing apparatus cause the data processing apparatus to perform the operations of the detokenization process 1500.

The detokenization process 1500 begins when an encrypted token 1510 is received (e.g., a token associated with credit card information is received at a token server). The detokenization process 1500 segments the encrypted token data and determines a full set of token data 1512 (e.g., the entire token string, such as 497476gMSxaG8835 continuing the example of FIG. 12), segmented token data-1 1514 (e.g., middle digits such as gMSxaG), and segmented token data-2 1516 (e.g., first six digits and the last four digits (6×4), such as 497476 . . . 8835). After segmenting the token data, the detokenization process 1500 then performs a database check 1520 to determine whether or not the token 1510 is present in the current data storage. As indicated by notification 1525, the token 1510 is present in the current data storage (e.g., sensitive data is available that corresponds to the token), thus the detokenization process 1500 proceeds to obtain the sensitive data 1530 from the sensitive data storage 1532.

Figure 16:
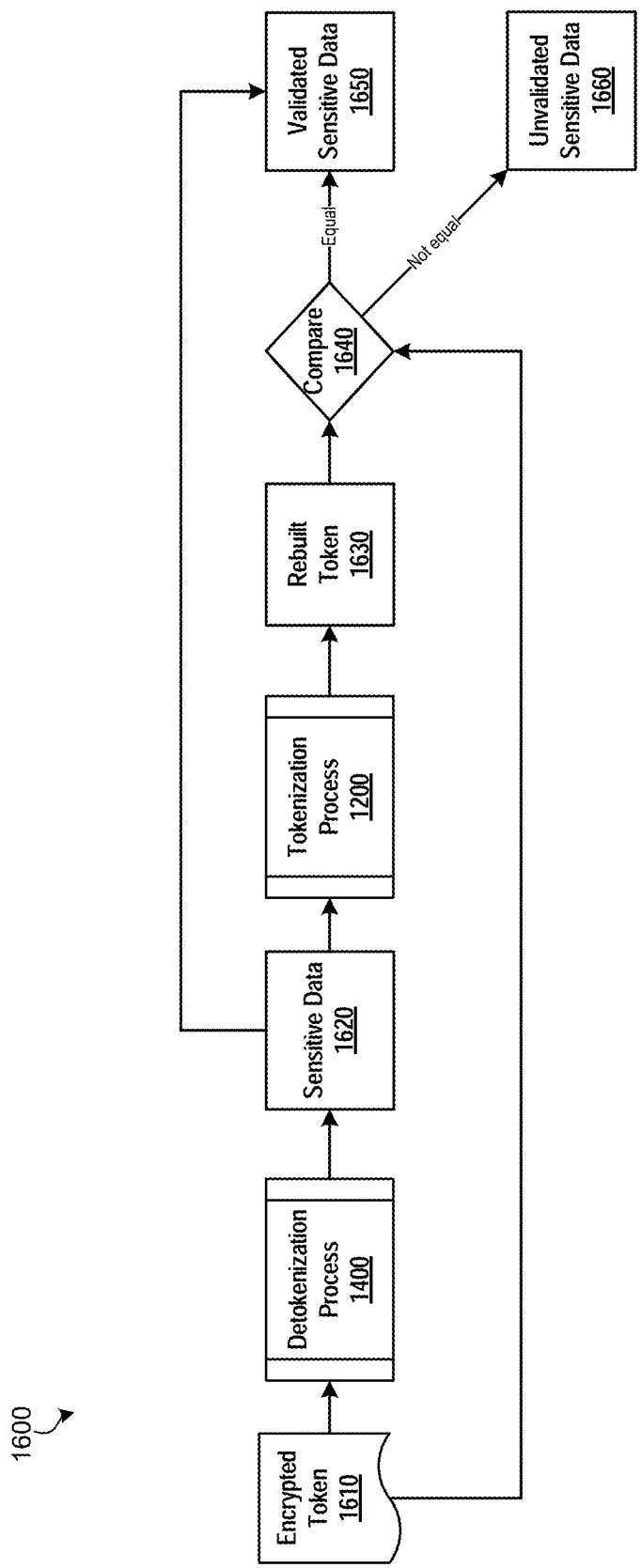
FIG. 16 is a block diagram of an example system for validating sensitive data from an encrypted token within a trusted environment using a detokenization service and a retokenization service.

FIG. 16 is a block diagram of an example system for validating an encrypted token within a trusted environment using a detokenization service and a retokenization service. In particular, FIG. 16 illustrates a flowchart of an example process 1600 of a validation process based on receiving an encrypted token to determine whether or not sensitive data associated with the token is valid, according to embodiments of the invention. Operations of the validation process 1400 can be implemented, for example, by a system that includes one or more data processing apparatus, such as the token server 130 of FIG. 1 utilizing a detokenization instruction set and utilizing one or more protocols. The validation process 1400 can also be implemented by instructions stored on computer storage medium, where execution of the instructions by a system that includes a data processing apparatus cause the data processing apparatus to perform the operations of the validation process 1400.

The validation process 1600 begins when an encrypted token 1610 is received (e.g., a token associated with credit card information is received at a token server). The encrypted token 1610 is then processed by the detokenization process 1400 of FIG. 14 in order to determine sensitive data 1620 (e.g., the detokenization process 1400 builds sensitive data block 1450 to combine the segmented sensitive data-2 1442 (e.g., middle digits of the credit card information) with the segmented token data-2 1416 (e.g., first six digits and the last four digits of the credit card information) to generate the full set of sensitive data 1452).

The validation process 1600 then sends the sensitive data 1620 determined by the detokenization process 1400 to the tokenization process 1200 of FIG. 12 in order to determine a rebuilt token 1630. In other words, the validation process 1600 utilizes the tokenization process 1200 as a retokenization process (e.g., the retokenization process of the tokenization process 1200 builds an encrypted token 1252 at token block 1250 which combines the segmented sensitive data-3 1246 (e.g., middle digits) with the segmented sensitive data-2 1216 (e.g., first six digits and the last four digits of the sensitive data)).

The validation process 1600 then performs a compare operation 1640 to compare the rebuilt token 1630 to originally received encrypted token 1610. In some implementations of the invention, the comparison between the encrypted token and the rebuilt token is based on using a first seed number associated with the encrypted token that corresponds to a second seed number associated with the rebuilt token. For example, the same database comprising random values is present in each cloud datacenter and is refreshed with a certain period of time, for example one week. This period of time is synchronized with the rate of production of tokens. More precisely, to generate a token, a row index is selected in the database comprising random values and the row index selection is based on a deterministic pseudo random generator using a seed that is changed with the same period as the one of refreshment of the database comprising random values. For example, the seed of the pseudo random generator is a week number. Accordingly, if the comparison (e.g., compare operation 1640 of FIG. 16) is done within the same week of the generation of received encrypted token, the row selection in the cloud datacenter will give the same deterministic result. Given the fact that during the same week, the database comprising the random values will also be the identical in each cloud datacenter, the rebuilt token will be the same as the encrypted token. Ultimately, we can notably test if the received encrypted is an old one.

The validation process 1600 then obtains the results of the compare operation 1640, and if the rebuilt token 1630 and the encrypted token 1610 match (e.g., "equal"), then the validation process 1600 provides the validated sensitive data 1650 to the API. On the other hand, if the rebuilt token 1630 and the encrypted token 1610 do not match (e.g., "not equal"), then the validation process 1600 provides an unvalidated sensitive data 1650 notification to the API. For example, the unvalidated sensitive data 1660 is identified as an expired token (e.g., the token is coming from a precedent period of token generation), thus the token will not be detokenized and instead an error message may be provided to an end user via an API or the like.

Figure 17:
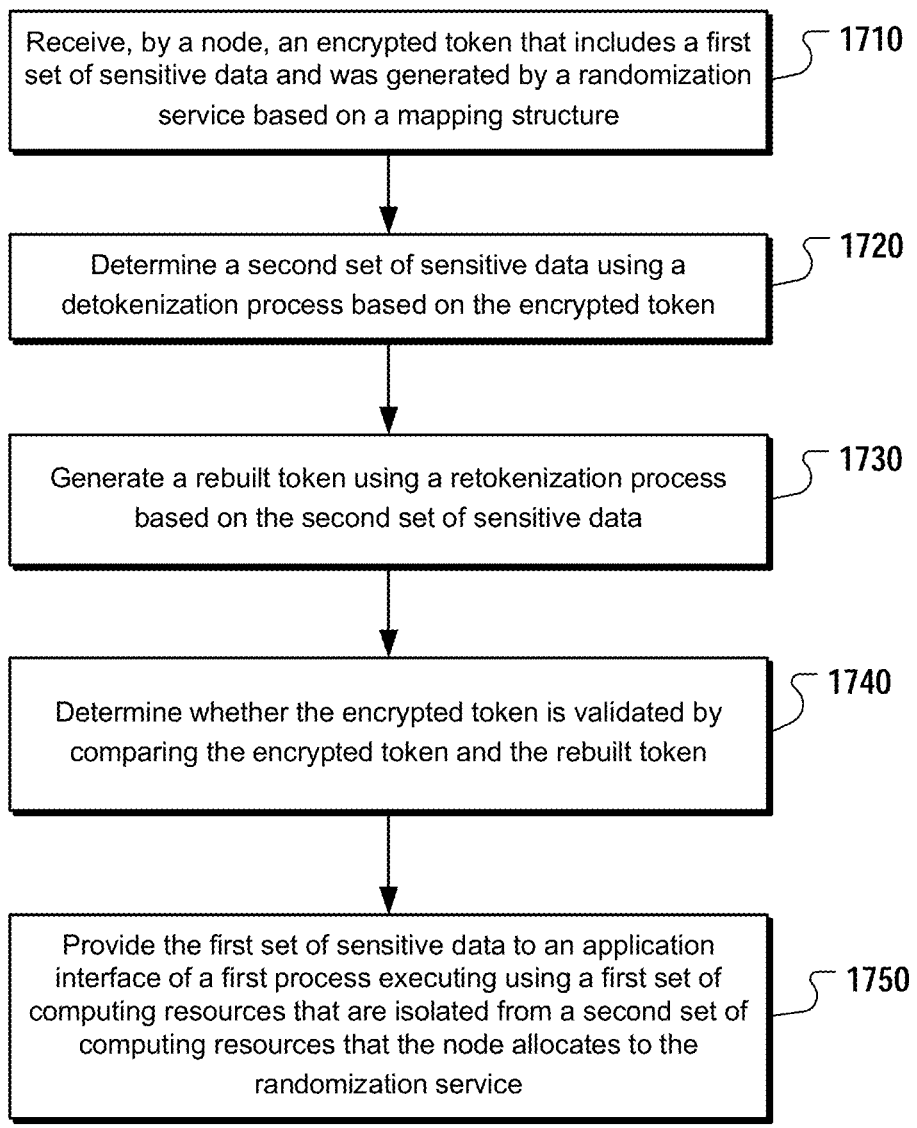
FIG. 17 is a flowchart illustrating an example of a method for implementing a tokenization authentication system, in accordance with an embodiment of the invention.

FIG. 17 is a flowchart of an example process 1700 for implementing a tokenization authentication system, in accordance with an embodiment of the invention. Operations of the process 1700 can be implemented, for example, by a system that includes one or more data processing apparatus, such as a token server 130 of FIG. 1 utilizing one or more protocols (e.g., a tokenization protocol, a detokenization protocol, an authentication/validation protocol, and the like). The process 1500 can also be implemented by instructions stored on computer storage medium, where execution of the instructions by a system that includes a data processing apparatus cause the data processing apparatus to perform the operations of the process 1500.

The system receives, by a node, an encrypted token that includes a first set of sensitive data and was generated by a randomization service based on a mapping structure (1710). For example, as illustrated in the validation process 1600 of FIG. 16, an encrypted token 1610 may be received at a node, where the encrypted token includes a first set of sensitive data (e.g., credit card info). In some implementations of the invention, the encrypted token was generated by a randomization service (e.g., a tokenization service) based on a mapping structure. For example, a randomization service may generate a token by selecting an index value based on a pseudorandom number generator that includes an initial value (e.g., a seed) that may include a timestamp plus credit card information, and the like. For example, each index may define a particular value that is random. In other words, the value to be used for tokenization is the one at the row of the index in a prepopulated database, the seed/initial value may include a timestamp plus credit card information, a week number, and the like.

In some implementations of the invention, the mapping structure includes a plurality of index values, and generating the token by the randomization service includes selecting an index value from among the plurality of index values. For example, a pseudo random generator determines a row number in which the initial value will be looked up. In some implementations of the invention, the initial value (e.g., a seed) is determined based on an index row selection of an index database such that the index/row selection is deterministic (e.g., selecting a week number). In some implementations of the invention, the initial value includes at least one of timestamp (e.g., week number) and credit card information (e.g., the seed/initial value may include credit card information and a week number). In other words, the deterministic property of a random generator with a given seed may be used to validate a token where the seed would be the week timestamp and the credit card.

The system determines a second set of sensitive data using a detokenization process based on the encrypted token (1720). For example, in the validation process 1600 of FIG. 16, a detokenization process 1400 decodes/decrypts the token based on using the mapping structure and an index value extracted from the token. In some implementations of the invention, a row selection is a deterministic operation based on the seed, such as a week number.

In some implementations of the invention, the mapping structure is a first mapping structure of a plurality of mapping structures, and the detokenization process detokenizes the encrypted token using the plurality of mapping structures. In the example of FIG. 8, that versioning of mapping structures is represented by the lowercase letters associated with each epoch start time. For example, first epoch 810 is associated with version "a", second epoch 820 is associated with version "b", and third epoch 830 is associated with version "c". In an embodiment, each token generated by a mapping structure comprising index-key pairs includes a version identifier indicative of a version associated with an epoch in which that token was generated.

The system generates a rebuilt token using a retokenization process based on the second set of sensitive data (1730). For example, in the validation process 1600 of FIG. 16, a rebuilt token 1630 is determined by the tokenization process 1200. In other words, the validation process 1600 performs a retokenization service of the sensitive data to determine a rebuilt token 1630 (e.g., credit card information).

The system determines whether the encrypted token is validated by comparing the encrypted token and the rebuilt token (1740). In some implementations of the invention, determining whether the encrypted token is validated is based on a deterministic operation associated with an initial value corresponding to the encrypted token. For example, in the validation process 1600 of FIG. 16, validation is based on the deterministic operation associated with the seed/initial value, thus determining that the rebuilt token is validated is based on a row selection which is deterministic based on the seed. For example, the same database comprising random values is present in each cloud datacenter and is refreshed with a certain period of time, for example one week. This period of time is synchronized with the rate of production of tokens. More precisely, to generate a token, a row index is selected in the database comprising random values and the row index selection is based on a deterministic pseudo random generator using a seed that is changed with the same period as the one of refreshment of the database comprising random values. For example, the seed of the pseudo random generator is a week number. Accordingly, if the comparison (e.g., compare operation 1640 of FIG. 16) is done within the same week of the generation of received encrypted token, the row selection in the cloud datacenter will give the same deterministic result. Given the fact that during the same week, the database comprising the random values will also be the identical in each cloud datacenter, the rebuilt token will be the same as the encrypted token. Ultimately, we can notably test if the received encrypted is an old one.

In some implementations of the invention, the comparison between the encrypted token (e.g., the received token) and the rebuilt token is based on determining the encryption data associated with the encrypted token matches encryption data associated with the rebuilt token. For example, the comparison (e.g., compare operation 1640 of FIG. 16) is done within the same week of the rebuilt token, which will be the same as the first token because the row index/selection is deterministic and have used the same seed (e.g., week number), thus the encrypted data of the encrypted token 1610 (e.g., the entire token string—"497476gMSxaG8835") should match the encrypted data of the rebuilt token 1630 (e.g., the same token string—"497476gMSxaG8835") because the same row selection in the cloud datacenter will give the same deterministic result based on using the same synchronized seed value (e.g., the same week). In other words, the goal is to compare the middle digit of the encrypted token received with the middle digit of the token rebuilt. Then, if the version of the received token is the same as current version, then the token has been supposedly created this week thus an attempt to tokenize the credit card information detokenized. Alternatively, if the version of the received token is not the same, that means that the received token has been generated before the swap of version. Therefore, the system may apply a different tokenization (e.g., go back one week prior) to tokenize the credit card information detokenized. Therefore, in some embodiments of the invention, the comparison operation is a matter of comparing the encrypted portion, but only because the encrypted portion is built from a particular version (which is taken as input), indexed, and then xor'ed (which is provided after the tokenization for verification).

The system provides the first set of sensitive data to an application interface of a first process executing using a first set of computing resources that are isolated from a second set of computing resources that the node allocates to the randomization service, in response to determining that the encrypted token is validated (1750). For example, this isolation provides a substantive advantage because doing so you avoid injecting dummy credit card in your payment operation. In some embodiments, the application interface is an API, a library, a remote API, a Web API, or a combination thereof. In some embodiments, the first set of computing resources are allocated to the process by the node. In some embodiments, the first set of computing resources are allocated to the process by another node of a system comprising the node that is external to the node. In some embodiments, the process is implemented using segmented application 580 of FIG. 5.

In some implementations of the invention, the process 1700 further includes, in response to determining that the encrypted token is not validated, providing an error message to the application interface. For example, as illustrated in FIG. 16, the unvalidated sensitive data 1660 is identified as an expired token (e.g., the credit card has expired), thus the token will not be detokenized and instead an error message may be provided to an end user via an API or the like.

In some implementations of the invention, the node is a first node at a first datacenter, and the encrypted token is received from a second node at a second datacenter that is different than the first datacenter. For example, the token validation process 1700 provides an efficient way to tokenize in a multi datacenter architecture and instantaneously detokenize a token from another datacenter. In some implementations of the invention, the first set of computing resources are allocated to the process executing using the first set of computing resources by a second node that is different than the first node. In some implementations of the invention, the first set of computing resources are allocated to the process by the node.

In some implementations of the invention, the process 1700 further includes encrypting the first set of sensitive data prior to providing the first set of sensitive data to the application interface of the first process executing using the first set of computing resources. In some implementations of the invention, the encrypted token and the first set of sensitive data are each composed of an equivalent number of bytes, and wherein the encrypted token comprises a first number of bits and the first set of sensitive data comprises a second number of bits that is different from the first number of bits.

Figure 18:
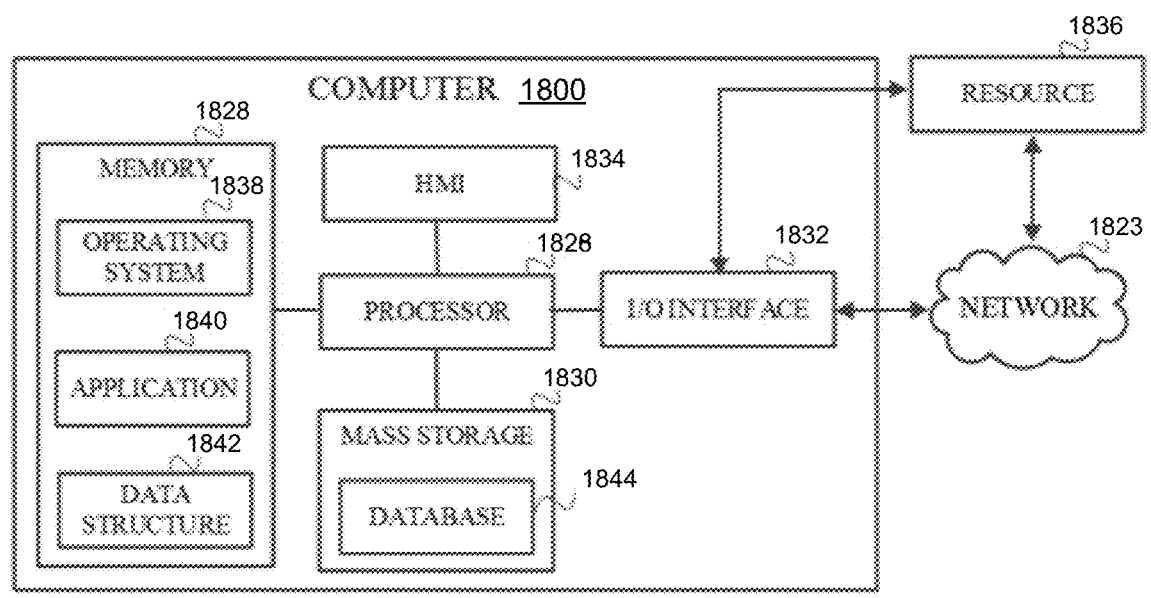
FIG. 18 is a block diagram of an example computing environment suitable for use in implementing embodiments of the invention.

Having described various embodiments of the invention, an exemplary computing environment suitable for implementing embodiments of the invention is now described. With reference to FIG. 18, client device 110; computing device 120; token server 130 and 320; HSM 140; internal system 160; and nodes 310, 330, 410, 430, and 500 may be implemented on one or more computer devices or systems, such as exemplary computer system 1800. The computer system 1800 may include a processor 1826, a memory 1828, a mass storage memory device 1830, an input/output (I/O) interface 1832, and a Human Machine Interface (HMI) 1834. The computer system 1800 may also be operatively coupled to one or more external resources 1836 via the network 1823 or I/O interface 1832. External resources may include, but are not limited to, servers, databases, mass storage devices, peripheral devices, cloud-based network services, or any other suitable computer resource that may be used by the computer system 1800.

The processor 1826 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1828. The memory 1828 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 1830 may include data storage devices such as a hard drive, optical drive, tape drive, non-volatile solid state device, or any other device capable of storing information.

The processor 1826 may operate under the control of an operating system 1838 that resides in the memory 1828. The operating system 1838 may manage computer resources so that computer program code embodied as one or more computer software applications, such as an application 1840 residing in memory 1828, may have instructions executed by the processor 1826. In an alternative embodiment, the processor 1826 may execute the application 1840 directly, in which case the operating system 1838 may be omitted. One or more data structures 1842 may also reside in memory 1828, and may be used by the processor 1826, operating system 1838, or application 1840 to store or manipulate data.

The I/O interface 1832 may provide a machine interface that operatively couples the processor 1826 to other devices and systems, such as the network 1823 or the one or more external resources 1836. The application 1840 may thereby work cooperatively with the network 1823 or the external resources 1836 by communicating via the I/O interface 1832 to provide the various features, functions, applications, processes, or modules comprising embodiments of the invention. The application 1840 may also have program code that is executed by the one or more external resources 1836, or otherwise rely on functions or signals provided by other system or network components external to the computer system 1800. Indeed, given the nearly endless hardware and software configurations possible, persons having ordinary skill in the art will understand that embodiments of the invention may include applications that are located externally to the computer system 1800, distributed among multiple computers or other external resources 1836, or provided by computing resources (hardware and software) that are provided as a service over the network 1823, such as a cloud computing service.

The HMI 1834 may be operatively coupled to the processor 1826 of computer system 1800 in a known manner to allow a user to interact directly with the computer system 1800. The HMI 1834 may include video or alphanumeric displays, a touch screen, a speaker, and any other suitable audio and visual indicators capable of providing data to the user. The HMI 1834 may also include input devices and controls such as an alphanumeric keyboard, a pointing device, keypads, pushbuttons, control knobs, microphones, etc., capable of accepting commands or input from the user and transmitting the entered input to the processor 1826.

A database 1844 may reside on the mass storage memory device 1830, and may be used to collect and organize data used by the various systems and modules described herein. The database 1844 may include data and supporting data structures that store and organize the data. In particular, the database 1844 may be arranged with any database organization or structure including, but not limited to, a relational database, a hierarchical database, a network database, or combinations thereof. In an embodiment, database 1844 may be used to implement one or more of: database 150, database 324, database 418, database 424, database 438, a database in memory 520, and a database in memory 570. A database management system in the form of a computer software application executing as instructions on the processor 1826 may be used to access the information or data stored in records of the database 1844 in response to a query, where a query may be dynamically determined and executed by the operating system 1838, other applications 1840, or one or more modules.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed:

1. A computer-implemented method comprising:
at an electronic device having a processor:
receiving, by a node, an encrypted token comprising a first set of sensitive data, wherein the encrypted token was generated by a randomization service based on a mapping structure;
determining, based on the encrypted token, a second set of sensitive data using a detokenization process;
generating, based on the second set of sensitive data, a rebuilt token using a retokenization process;
determining whether the encrypted token is validated by comparing the encrypted token and the rebuilt token; and
in response to determining that the encrypted token is validated, providing the first set of sensitive data to an application interface of a first process executing using a first set of computing resources that are isolated from a second set of computing resources that the node allocates to the randomization service.

2. The method of claim 1, wherein the mapping structure includes a plurality of index values, and wherein generating the token by the randomization service comprises selecting an index value from among the plurality of index values from a random value database.

3. The method of claim 2, wherein the index value is determined based on an index row selection of an index database.

4. The method of claim 2, wherein the index value is selected based on utilization of a deterministic pseudo random generator.

5. The method of claim 4, wherein the pseudo random generator selects the index value based on a seed, wherein the seed iteratively changes at a same frequency as the random value database.

6. The method of claim 1, wherein the detokenization process decodes the token based on the mapping structure and an index value extracted from the token.

7. The method of claim 1, wherein the mapping structure is a first mapping structure of a plurality of mapping structures, and wherein the detokenization process detokenizes the encrypted token using the plurality of mapping structures.

8. The method of claim 1, wherein the comparison between the encrypted token and the rebuilt token is based on determining the encryption data associated with the encrypted token matches encryption data associated with the rebuilt token.

9. The method of claim 1, further comprising:
in response to determining that the encrypted token is not validated, providing an error message to the application interface.

10. The method of claim 1, wherein the node is a first node at a first datacenter, and wherein the encrypted token is received from a second node at a second datacenter that is different than the first datacenter.

11. The method of claim 1, wherein the node is a first node, and wherein the first set of computing resources are allocated to the process executing using the first set of computing resources by a second node that is different than the first node.

12. The method of claim 1, wherein the first set of computing resources are allocated to the process by the node.

13. The method of claim 1, further comprising:
encrypting the first set of sensitive data prior to providing the first set of sensitive data to the application interface of the first process executing using the first set of computing resources.

14. The method of claim 1, wherein the encrypted token and the first set of sensitive data are each composed of an equivalent number of bytes, and wherein the encrypted token comprises a first number of bits and the first set of sensitive data comprises a second number of bits that is different from the first number of bits.

15. A system comprising:
one or more processors;
at least one memory device coupled with the one or more processors; and
a data communications interface operably associated with the one or more processors, wherein the at least one memory device contains a plurality of program instructions that, when executed by the one or more processors, cause the one or more processors to:
receive, by a node, an encrypted token comprising a first set of sensitive data, wherein the encrypted token was generated by a randomization service based on a mapping structure;
determine, based on the encrypted token, a second set of sensitive data using a detokenization process;
generate, based on the second set of sensitive data, a rebuilt token using a retokenization process;
determine whether the encrypted token is validated by comparing the encrypted token and the rebuilt token; and
in response to determine that the encrypted token is validated, provide the first set of sensitive data to an application interface of a first process executing using a first set of computing resources that are isolated from a second set of computing resources that the node allocates to the randomization service.

16. The system of claim 15, wherein the mapping structure includes a plurality of index values, and wherein generating the token by the randomization service comprises selecting an index value from among the plurality of index values from a random value database.

17. The system of claim 16, wherein the index value is determined based on an index row selection of an index database.

18. The system of claim 16, wherein the index value is selected based on utilization of a deterministic pseudo random generator.

19. The system of claim 18, wherein the pseudo random generator selects the index value based on a seed, wherein the seed iteratively changes at a same frequency as the random value database.

20. A computer program product comprising:
a non-transitory computer-readable storage medium; and
program code stored on the non-transitory computer-readable storage medium that, when executed by one or more processors, causes the one or more processors to:
receive, by a node, an encrypted token comprising a first set of sensitive data, wherein the encrypted token was generated by a randomization service based on a mapping structure;
determine, based on the encrypted token, a second set of sensitive data using a detokenization process;
generate, based on the second set of sensitive data, a rebuilt token using a retokenization process;
determine whether the encrypted token is validated by comparing the encrypted token and the rebuilt token; and
in response to determine that the encrypted token is validated, provide the first set of sensitive data to an application interface of a first process executing using a first set of computing resources that are isolated from a second set of computing resources that the node allocates to the randomization service.

* * * * *